United States Patent
Watanabe et al.

(10) Patent No.: US 10,274,142 B2
(45) Date of Patent: Apr. 30, 2019

(54) LIGHTING DEVICE AND DISPLAY DEVICE

(71) Applicant: SHARP KABUSHIKI KAISHA, Sakai, Osaka (JP)

(72) Inventors: Hisashi Watanabe, Sakai (JP); Ryuzo Yuki, Sakai (JP); Hirotoshi Yasunaga, Sakai (JP); Mitsuhiro Murata, Sakai (JP); Makoto Yoshimura, Sakai (JP); Hiromi Enomoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/763,583

(22) PCT Filed: Sep. 26, 2016

(86) PCT No.: PCT/JP2016/078162
§ 371 (c)(1),
(2) Date: Mar. 27, 2018

(87) PCT Pub. No.: WO2017/057219
PCT Pub. Date: Apr. 6, 2017

(65) Prior Publication Data
US 2018/0274740 A1  Sep. 27, 2018

(30) Foreign Application Priority Data
Sep. 30, 2015  (JP) .................. 2015-193190

(51) Int. Cl.
*F21K 9/20*       (2016.01)
*F21S 2/00*       (2016.01)
(Continued)

(52) U.S. Cl.
CPC .............. *F21S 2/005* (2013.01); *F21K 9/20* (2016.08); *G02B 6/005* (2013.01); *G02B 6/0053* (2013.01);
(Continued)

(58) Field of Classification Search
CPC ....... F21S 2/005; G02B 6/005; G02B 6/0088; G02B 6/0053; G02F 1/133615; F21K 9/20; F21Y 2115/10
See application file for complete search history.

(56) References Cited

U.S. PATENT DOCUMENTS
2011/0261585 A1  10/2011 Shibata et al.
2012/0230008 A1  9/2012 Ajichi et al.
(Continued)

FOREIGN PATENT DOCUMENTS
JP  2005-268021 A  9/2005
JP  2006-184350 A  7/2006
(Continued)

*Primary Examiner* — Joseph L Williams
*Assistant Examiner* — Jose M Diaz
(74) *Attorney, Agent, or Firm* — ScienBiziP, P.C.

(57) ABSTRACT

A backlight device includes LEDs, a light guide plate, an LED substrate, an optical sheet, and a low light-transmissive member. The light guide plate includes a light entering end surface, a light exiting plate surface, and an opposite plate surface. The LED substrate is disposed such that at least a section of the LED substrate overlaps a light entering-side edge section that is an edge section of the light guide plate on the light entering end surface side. The optical sheet includes a light entering-side edge section overlapping section disposed on the light exiting plate surface side of the light guide plate to overlap the light entering-side edge section. The low light-transmissive member disposed on the light entering-side edge section overlapping section of the optical sheet. The low light-transmissive member has a light transmissivity lower than that of other sections of the optical sheet.

14 Claims, 25 Drawing Sheets

(51) Int. Cl.
*F21V 8/00* (2006.01)
*F21Y 115/10* (2016.01)
*G02F 1/1335* (2006.01)

(52) U.S. Cl.
CPC ..... *G02B 6/0088* (2013.01); *G02F 1/133615* (2013.01); *F21Y 2115/10* (2016.08)

(56) References Cited

U.S. PATENT DOCUMENTS

| | | |
|---|---|---|
| 2013/0021558 A1 | 1/2013 | Momose et al. |
| 2015/0160401 A1 | 6/2015 | Namekata et al. |
| 2016/0202410 A1 | 7/2016 | Momose et al. |
| 2017/0261814 A1 | 9/2017 | Momose et al. |
| 2018/0173058 A1* | 6/2018 | Yuki ................. G02B 6/0051 |

FOREIGN PATENT DOCUMENTS

| | | |
|---|---|---|
| JP | 2011-249320 A | 12/2011 |
| JP | 2013-024960 A | 2/2013 |
| JP | 2015-111518 A | 6/2015 |
| WO | 2011/080955 A1 | 7/2011 |
| WO | 2015/037404 A1 | 3/2015 |

* cited by examiner

LIGHTING DEVICE AND DISPLAY DEVICE

TECHNICAL FIELD

The present invention relates to a lighting device and a display device.

BACKGROUND ART

A display module described in Patent Document 1 is conventionally known as one example of a display module including a liquid crystal display panel and a backlight unit. In the display module described in Patent Document 1, on a light exiting surface of a light guide plate in the backlight unit arranged on a rear surface side of the liquid crystal display panel, a light absorbing layer is arranged by printing and applying black ink on a diffuser sheet in an area corresponding to an LED of a flange portion between a light emitting area set on the light exiting surface and an effective display area on an inner side of the light emitting area, so that light ray, which is emitted from the LED, normally reflected by a light reflection sheet, and attempting to exit to a light source side edge portion of the effective display area, is absorbed.

Patent Document 1: Japanese Unexamined Patent Publication No. 2006-184350

Problem to be Solved by the Invention

In the display module described in Patent Document 1, a part of a flexible wiring substrate, on which the LED is mounted, is arranged to overlap the light exiting surface of the light guide plate, and hence a portion overlapping the flexible wiring substrate in the light exiting surface is arranged outside the light emitting area. The diffuser sheet, on the other hand, is arranged so as not to overlap the flexible wiring substrate on the light exiting surface of the light guide plate, and is located outside the effective display area although the printed light absorbing layer is within the light emitting area. Thus, the flexible wiring substrate and the light absorbing layer are arranged so as not to overlap each other and are arranged outside the effective display area, and hence a frame of the display module is wide and it is difficult to narrow the frame of the display module.

DISCLOSURE OF THE PRESENT INVENTION

The present invention was made in view of the above circumstances. An object is to reduce a frame size.

Means for Solving the Problem

A lighting device of the present invention includes at least one light source, a light guide plate, a light source substrate, at least one optical member, and at least one low light-transmissive member. The light guide plate includes a light entering end surface through which light from the at least one light source enters and a pair of plate surfaces. The light entering end surface is an outer peripheral end surface. The pair of plate surfaces includes a first plate surface configured as a light exiting plate surface through which the light exits and a second plate surface configured as an opposite plate surface. The at least one light surface is mounted on the light source substrate. The light source substrate is disposed such that at least a section thereof overlaps a light entering-side edge section of the light guide plate on an opposite plate surface side. The light entering-side edge section is an edge section of the light guide plate on a light entering end side. The at least one optical member includes a light entering-side edge section overlapping section disposed on the light exiting plate surface side with respect to the light guide plate to overlap the light entering-side edge section. The at least one low light-transmissive member is disposed in at least the light entering-side edge section overlapping section of the at least one optical member having a light transmissivity lower than that of other sections of the at least one optical member.

According to the configuration, the light from the at least one light source enters the light guide plate through the light entering end surface, travels through the light guide plate, and exits through the light exiting plate surface. Then, the light exits to the outside after optical effects are exerted on the light by the at least one optical member. The light source substrate on which the light source is mounted is disposed such that the section thereof overlaps the entering-side edge section of the light guide plate on the opposite plate surface side. Therefore, the frame size of the lighting device is further reduced, the section of the light source substrate which overlaps the light entering-side edge section of the light guide plate is less likely to be recognized as a dark portion compared to a configuration in which the light source substrate is disposed such that a section thereof overlaps the light entering-side edge section on the light exiting plate surface side. This configuration is preferable for reducing the frame size of the lighting device.

On light entering-side overlapping section of the at least one optical member that is disposed on the light exiting plate surface side with respect to the light guide plate which overlaps at least the light entering-side edge section of the light guide plate, the low light-transmissive member having the light transmissivity lower than that of the other sections of the at least one optical member is disposed. Therefore, even if the light emitted by the light source includes light rays that travel directly toward the light entering-side edge section overlapping section of the at least one optical member without passing through the light guide plate, the light rays are less likely to pass through the light entering-side edge section overlapping section because of the low light-transmissive member. Thus, occurrence of uneven brightness, such as a local bright spot viewed in an area of the light guide plate around the light source, can be properly reduced. If the occurrence of uneven brightness in the area of the light guide plate around the light source is reduced, an area in which the light exiting through the light exiting plate surface is effectively used can be increased. This configuration is preferable for reducing the frame size of the lighting device. Furthermore, the light source substrate that includes the section overlapping the light entering-side edge section of the light guide plate on the opposite plate surface side is disposed to overlap the low light-transmissive member disposed on the light entering-side edge section overlapping section of the at least one optical member. In comparison to a configuration in which the light source substrate and the low light-transmissive member do not overlap each other, this configuration if more preferable for reducing the frame size of the lighting device.

Preferred embodiments of the present invention may include the following configurations.

(1) The at least one optical member may include an extended portion that extends from the light entering-side edge section overlapping section toward the at least one light source. The extended portion may include a section that overlaps the at least one light source. The at least one low light-transmissive member may extend from at least the light entering-side edge section overlapping section to the extended portion. Therefore, even if the light emitted by the at least one light source includes light rays that travel directly toward the light entering-side edge section overlapping section and the extended portion of the at least one optical member without passing through the light guide plate, the light rays are less likely to travel through the light entering-side edge section overlapping section and the extended portion because of the at least one low light-transmissive member. Therefore, the local bright spot is further less likely to be recognized in an area of the light guide plate around the at least one light source.

(2) The at least one low light-transmissive member may be disposed on a surface of the at least one optical member on a light guide plate side. In comparison to a configuration in which the at least one low light-transmissive member is disposed on a surface of the at least one optical member on am opposite side from the light guide plate side, entering of the light rays to the at least one optical member is properly suppressed by the at least one low light-transmissive member.

(3) The at least one optical member may include optical members that overlap each other. The at least one low light-transmissive member may be disposed on the optical member-closest to the light guide plate. Therefore, even if the light emitted by the at least one light source includes light rays that travel directly toward the light entering-side edge section overlapping section of the optical members without passing through the light guide plate, entering of the light rays to the light entering-side edge section overlapping section is suppressed because of the at least one low light-transmissive member that is disposed on a surface of the optical member closest to the light guide plate. According to the configuration, the entering of the light rays to the optical members without passing through the light guide plate is properly suppressed. Therefore, the occurrence of uneven brightness can be further properly suppressed.

(4) The at least one low light-transmissive member may be disposed to overlap a non-effective light exiting area that is an area of the light exiting plate surface that may be sectionalized to an effective light exiting area from which light effectively exits and the non-effective light exiting area that surround the effective light exiting area. In comparison to a configuration in which the low light-transmissive member is disposed to overlap the non-effective light exiting area of the light exiting plate surface, the low light-transmissive member is less likely to be recognized. This configuration is preferable for suppressing the uneven brightness.

(5) The at least low light-transmissive member may be two-dimensionally arranged outer than an inner boundary of the non-effective light exiting area. According to the configuration, the low light-transmissive member is further less likely to be recognized. This configuration is further preferable for suppressing the uneven brightness.

(6) The at least one low light-transmissive member may be two-dimensionally arranged to cross a boundary between a non-effective light exiting area and an effective light exiting area of the light exiting plate surface that may be sectionalized to the effective light exiting area from which light effectively exits and the non-effective light exiting area that surrounds the effective light exiting area. The at least one low light-transmissive member may include a section that overlaps the effective light exiting area having light transmissivity higher than that of a section that overlaps the non-effective light exiting area. According to the configuration, because the at least one low light-transmissive member may be disposed to overlap the effective light exiting area, the frame size can be further reduced in comparison to a configuration in which the entire area of the at least one low light-transmissive member is within the non-effective light exiting area. Furthermore, because the section of the at least one low light-transmissive member which overlaps the effective light exiting area may have the light transmissivity higher than that of the section that overlaps the non-effective light exiting area, the section of the at least one low light-transmissive member which overlaps the non-effective light exiting area is less likely to be recognized. Therefore, the uneven brightness is less likely to occur.

(7) The low light-transmissive member may include a light blocking layer that is laid on the at least one optical member. According to the configuration, the light rays that travel directly from the at least one light source to the light entering-side edge section overlapping section of the at least one optical member without passing through the light guide plate can be blocked by the light blocking layer, which is the low light-transmissive member. Therefore, the light rays are less likely to enter the light entering-side edge section overlapping section. This configuration is further preferable for suppressing the occurrence of uneven brightness.

(8) The at least one light source may include light sources that are arranged in line along a length direction of the light entering end surface. The at least one low light-transmissive member may include low light-transmissive members that are arranged in line to overlap the light sources in the length direction of the at least one optical member. According to the configuration, the light rays that travel from the light sources directly toward the light entering-side edge section overlapping section of the at least one optical member without passing through the light guide plate can be effectively reduced by the low light-transmissive members arranged to overlap the light sources in the length direction of the light entering end surface of the at least one optical member. Therefore, the occurrence of uneven brightness is properly suppressed. The light rays are less likely travel from the light sources directly toward a section of the light source-side edge section overlapping section which does not overlap the light sources in the length direction of the light entering end surface without passing through the light guide plate. Therefore, the uneven brightness is less likely to occur. Because the low light-transmissive member is not disposed in the section of the at least one optical member which does not overlap the light sources in the length direction of the light entering end surface, the light rays are not excessively absorbed by the low light-transmissive member. Therefore, a reduction in brightness is suppressed.

(9) The lighting device may include light guide plate fixing members that fix the light entering-side edge section overlapping section to at least the light entering-side edge section. The light guide plate fixing members may be arranged in line not to overlap the low light-transmissive members in the length direction. Because the light entering-side edge section overlapping section of the at least one optical member may be fixed to the light entering-side edge section of the light guide plate with the light guide plate fixing members, the at least one optical member is positioned relative to the light guide plate. Thus, the function of the low light-transmissive member arranged on the optical sheet can be appropriately exerted, and the occurrence of uneven brightness can be properly suppressed. The light rays in the light entering-side edge section may be guided toward the light guide plate fixing members by the light guide plate fixing members that may be in direct contact with the light entering-side edge section. Even in such a situation, the light rays are less likely to reach the low light-transmissive members because the light guide plate fixing members may be arranged in line not to overlap the low light-transmissive members. Thus, the light rays are less likely to be excessively absorbed by the low light-transmissive members and thus the reduction in brightness is further properly suppressed.

(10) The at least one optical member may include an extended portion that extends from the light entering-side edge section overlapping section toward the at least one light source. The extended portion may include a section that overlaps the at least one light source. The light guide plate may include projections that project outward from the light entering end surface toward the light source side. The projections may be arranged in line to overlap the light guide plate fixing members in the length direction. The light guide plate fixing members may fix the light entering-side edge section overlapping section and the extended portion to the light entering-side edge section and the projections. Because not only the light entering-side edge section overlapping section is fixed to the light entering-side edge section with the light guide plate fixing members but also the extended portion is fixed to the projections with the light guide plate fixing members, a stronger fixing force is obtained. Thus, the at least one optical member can be more properly positioned relative to the light guide plate.

(11) The lighting device may further include a frame and a frame fixing member. The frame may have a rim shape to surround the at least one light source and the light guide plate. The frame fixing member may fix the at least one optical member to the frame. According to the configuration, the at least one optical member may be fixed to the frame that surrounds the at least one light source and the light guide plate with the frame fixing member. Therefore, the at least one optical member may be positioned relative to the frame and thus the function of the low light-transmissive member disposed on the optical sheet can be appropriately exerted. Therefore, the occurrence of uneven brightness can be properly suppressed.

(12) The frame may include a concave portion. The at least one optical member may include a convex portion inserted in the concave portion. With the convex portion of the at least one optical member inserted in the concave portion of the frame, the at least one optical member can be positioned relative to the frame.

Next, in order to solve the problem described above, a display device according to the present invention may include the lighting device described above and a display panel configured to display an image using light from the lighting device. According to the configuration of the display device in which the frame size of the lighting device is reduced, high quality in design can be achieved.

Advantageous Effect of the Invention

According to the present invention, the frame size can be reduced.

BEST MODE FOR CARRYING OUT THE INVENTION

First Embodiment

A first embodiment of the present invention will be described with reference to FIGS. 1 to 7. In the present embodiment, a liquid crystal display device (display device) 10 including a liquid crystal panel 11 as a display panel is illustrated. X axis, Y axis, and Z axis are shown at a part of each figure, where each axial direction is drawn to be the direction shown in each figure. Furthermore, FIG. 2 is used as a reference for an up and down direction, where an upper side in the figure is a front side and a lower side in the figure is a back side.

Figure 1:
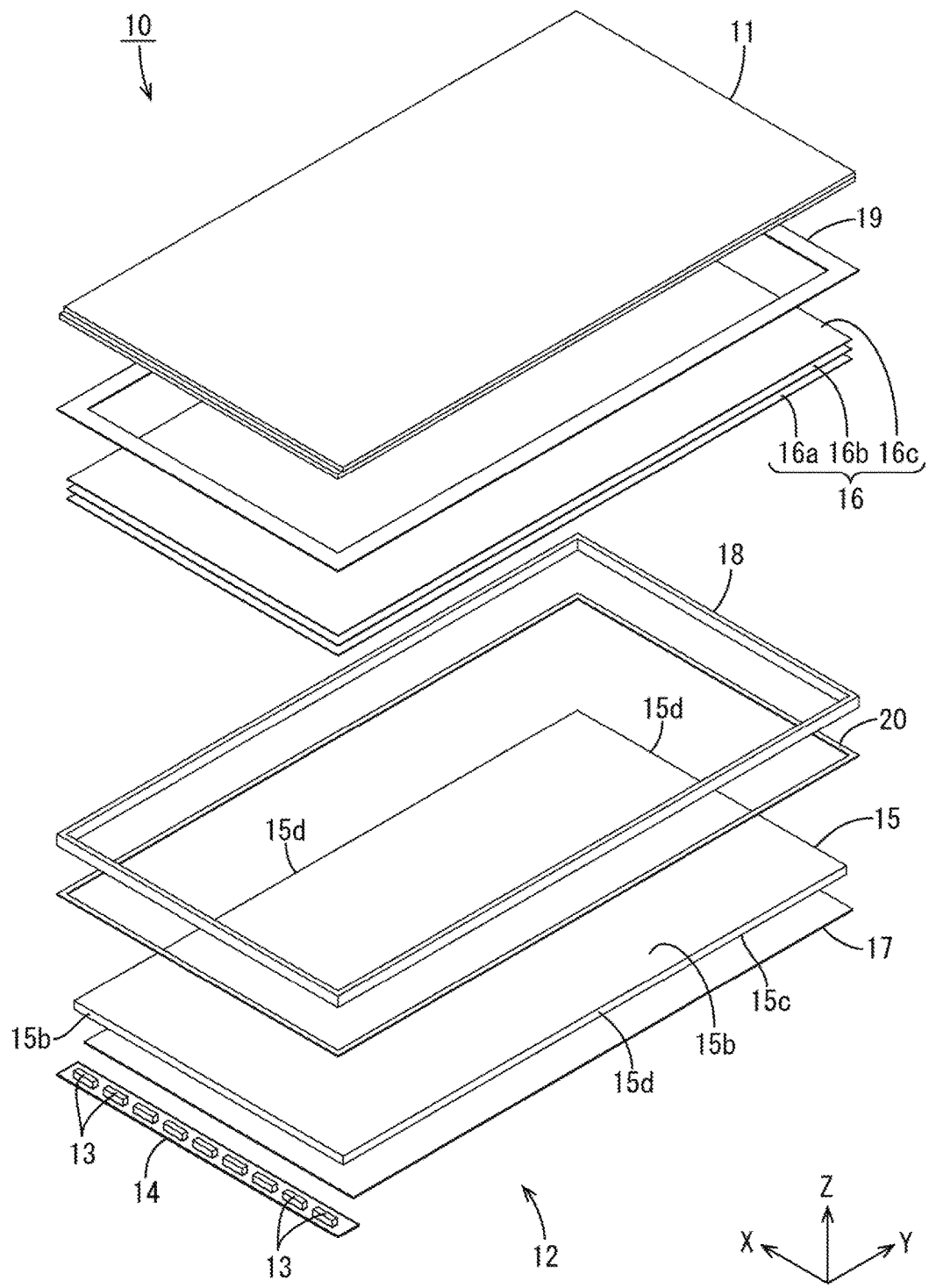
FIG. 1 is an exploded perspective view of a liquid crystal display device according to a first embodiment of the present invention.
Figure 2:
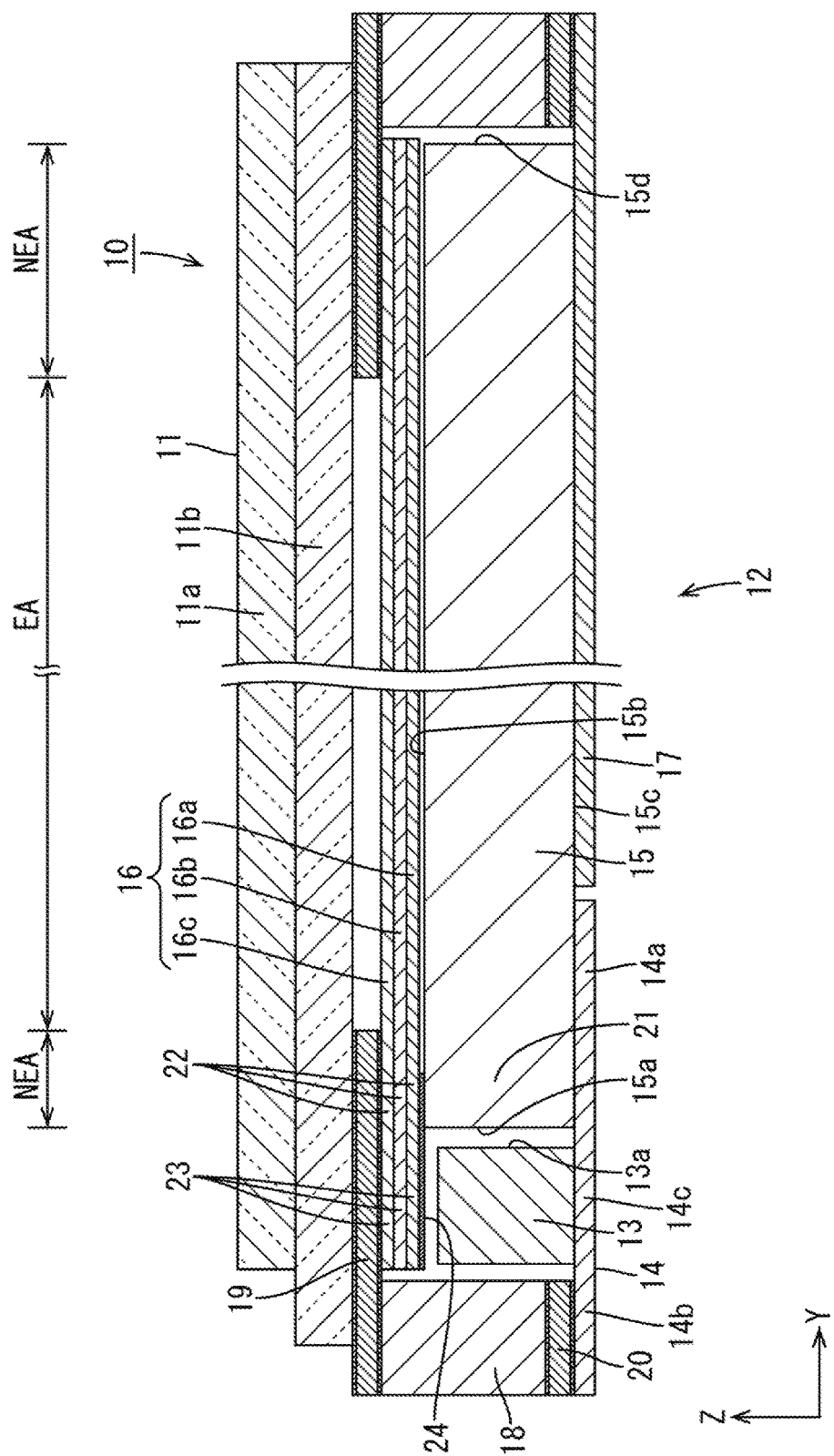
FIG. 2 is a side cross-sectional view of the liquid crystal display device.

The liquid crystal display device 10 overall has a rectangular shape, and includes a liquid crystal panel (display panel) 11 that can display an image, and a backlight device (lighting device) 12, which is an external light source that is arranged on a back side with respect to the liquid crystal panel 11 and that provides light to the liquid crystal panel 11, as shown in FIG. 1. A bezel having a rim shape (not shown), for example, is arranged on the front side of the liquid crystal panel 11, so that a configuration of sandwiching and holding an outer-peripheral side portion (non-display area to be described later) of the liquid crystal panel 11 with the backlight device 12 can be adopted. Other than this, a touch panel or a cover panel (not shown) can be placed over on the front side of the liquid crystal panel 11. The liquid crystal display device 10 according to the present embodiment is mainly used in portable electronic equipment such as a smartphone, a tablet notebook personal computer and the like, and a screen size of which is, for example, about 4 inches to about 20 inches.

First, the liquid crystal panel 11 will be described in detail. The liquid crystal panel 11 overall has a rectangular shape when seen in a plan view, and as shown in FIGS. 1 and 2, includes a substantially transparent pair of substrates 11a, 11b made of glass excellent in translucency, and a liquid crystal layer (not shown) interposed between the substrates 11a, 11b and containing liquid crystal molecules, which are substances in which optical properties change with electric field application, where the substrates 11a, 11b are laminated with a seal agent (not shown) while maintaining a gap of a thickness of the liquid crystal layer. A display surface of the liquid crystal panel 11 is sectionalized to a display area (active area) in which the image is displayed, and a non-display area (non-active area) having a frame shape (rim shape) surrounding the display area and in which an image is not displayed. A front side (front surface side) of the substrates 11a, 11b configuring the liquid crystal panel 11 is a CF substrate 11a, and a back side (rear surface side) is an array substrate 11b. The other end side of a flexible substrate (not shown along with signal providing source) having one end side connected to a signal providing source (control substrate, etc.) is connected to the array substrate 11b, so that various types of signals from the signal providing source can be provided. Furthermore, a polarizing plate (not shown) is attached to respective outer surface sides of the substrates 11a, 11b. A short side direction in the liquid crystal panel 11 coincides with the Y axis direction, a long side direction coincides with the X axis direction, and a thickness direction coincides with the Z axis direction.

An internal structure (illustration is omitted) in the display area of the liquid crystal panel 11 will now be described. On an inner surface side (liquid crystal layer side, opposing surface side with respect to CF substrate 11a) in the array substrate 11b, a TFT (Thin Film Transistor), which is a switching element, and a pixel electrode are arranged in great numbers in a matrix form, and a gate wiring and a source wiring forming a lattice shape are arranged to surround the periphery of the TFTs and the pixel electrodes. A signal related to an image is provided by the signal providing source to the gate wiring and the source wiring. The pixel electrode arranged in a square area surrounded by the gate wiring and the source wiring consists of a transparent electrode made of ITO (Indium Tin Oxide) or ZnO (Zinc Oxide). On the other hand, a great number of color filters are arranged in a line on the CF substrate 11a at a position corresponding to each pixel. The color filter is arranged such that three colors of R, G, and B are alternately lined. A light blocking layer (black matrix) for preventing color mixing is formed between the color filters. A counter electrode opposing the pixel electrode on the array substrate 11b side is arranged on the front surface of the color filter and the light blocking layer. The CF substrate 11a is one size smaller than the array substrate 11b. An alignment film for aligning the liquid crystal molecules contained in the liquid crystal layer is formed on the respective inner surface sides of the substrates 11a, 11b.

A configuration of the backlight device 12 will now be described in detail. The backlight device 12 overall has a rectangular substantially block shape when seen in a plan view, similarly to the liquid crystal panel 11. As shown in FIG. 1, the backlight device 12 at least includes an LED (Light Emitting Diode) 13, which is a light source, an LED substrate (light source substrate) 14 on which the LED 13 is mounted, a light guide plate 15 that guides the light from, the LED 13, an optical sheet (optical, member) 16 stacked and arranged on the front side of the light guide plate 15, a reflection sheet (reflection member) 17 stacked and arranged on the back side of the light guide plate 15, and a rim-shaped frame (rim-shaped member) 18 collectively surrounding the LED 13, the light guide plate 15, and the optical sheet 16. The backlight device 12 is of a one side light entering edge light type (side light type) in which the LED 13 (LED substrate 14) is arranged in an eccentrically located manner so as to be closer to one end on the short side of the backlight device 12 and the liquid crystal panel 11 such that light enters from only one side with respect to the light guide plate 15. Configuring components of the backlight device 12 will be sequentially described below.

As shown in FIGS. 1 and 2, the LED 13 has a configuration in which an LED chip (LED element), which is a semiconductor light emitting element, is sealed with a resin material on a substrate portion securely attached to a plate surface of the LED substrate 14. The LED chip mounted on the substrate portion has one type of main emission waveform, and specifically, one that emits a single color of blue is used. A phosphor that is excited by a blue light emitted from, the LED chip and that emits a predetermined color is dispersed and compounded in the resin material for sealing the LED chip, so that a substantially white light is emitted as a whole. The LED 13 is a so-called side surface light emitting type in which a side surface adjacent to the mounting surface with respect to the LED substrate 14 is a light emitting surface 13a.

As shown in FIGS. 1 and 2, the LED substrate 14 has a film shape (sheet shape) made from an insulating material and having flexibility, a plate surface of which is parallel to the plate surface of the liquid crystal panel 11 and the like. The LED substrate 14 has a horizontally long rectangular shape when seen in a plan view, and is accommodated in the backlight device 12 in an orientation in which a long side direction coincides with the short side direction (X axis direction) of the backlight device 12 and a short side direction coincides with the long side direction (Y axis direction) of the backlight device 12. The LED 13 is surface-mounted on the plate surface on the front side in the LED substrate 14 (plate surface on frame 18 and light guide plate 15 side), and the surface is assumed as the mounting surface. On the mounting surface of the LED substrate 14, a soldering portion and a wiring pattern (both illustrations are omitted) for supplying power to the LED 13 are patterned. As will be described later, the LED substrate 14 has a part arranged to overlap the respective back side (opposite plate surface 15c side) with respect to the frame 18 and the light guide plate 15 in the Z axis direction.

Figure 3:
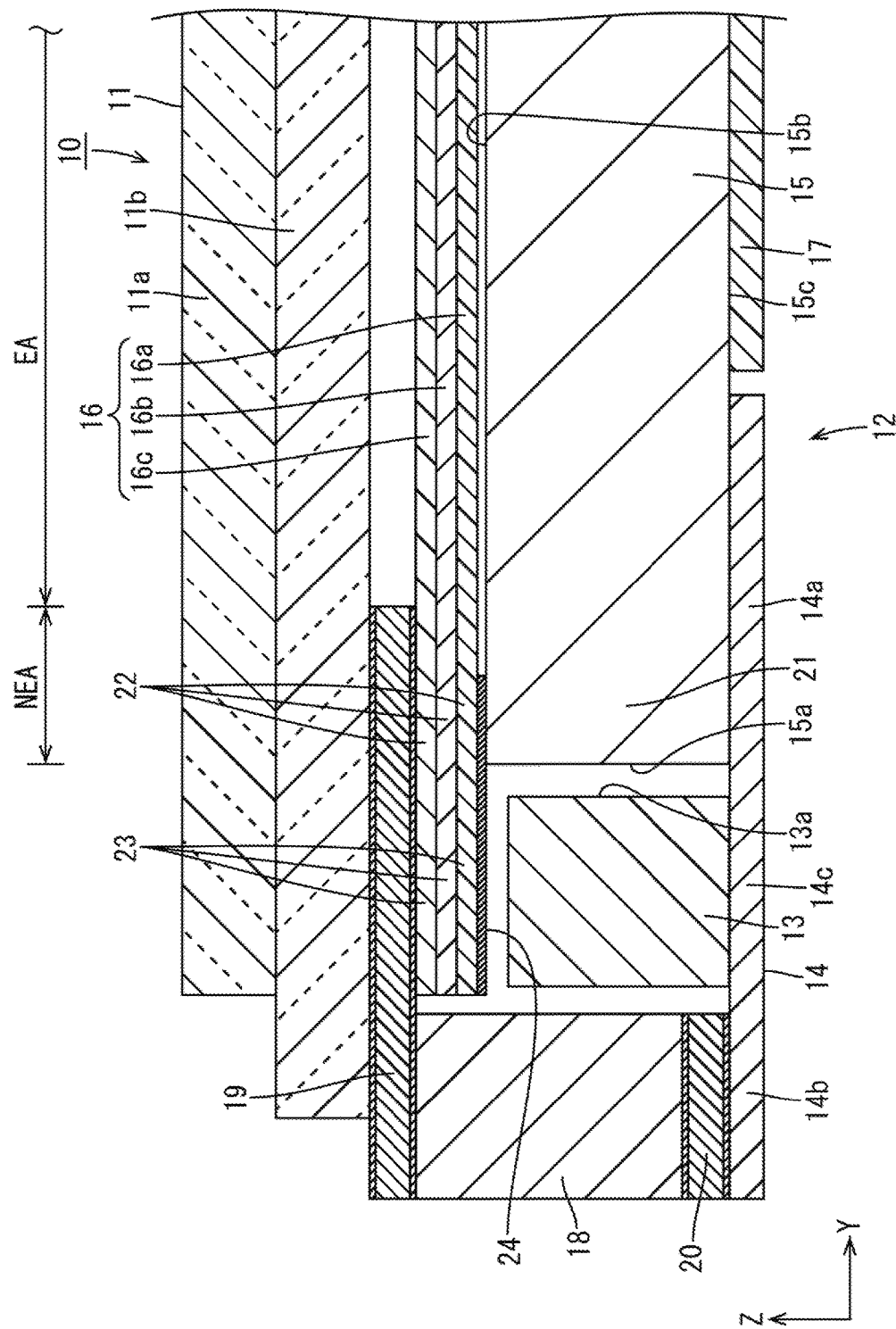
FIG. 3 is an enlarged side cross-sectional view of a vicinity of an LED in FIG. 2.
Figure 4:
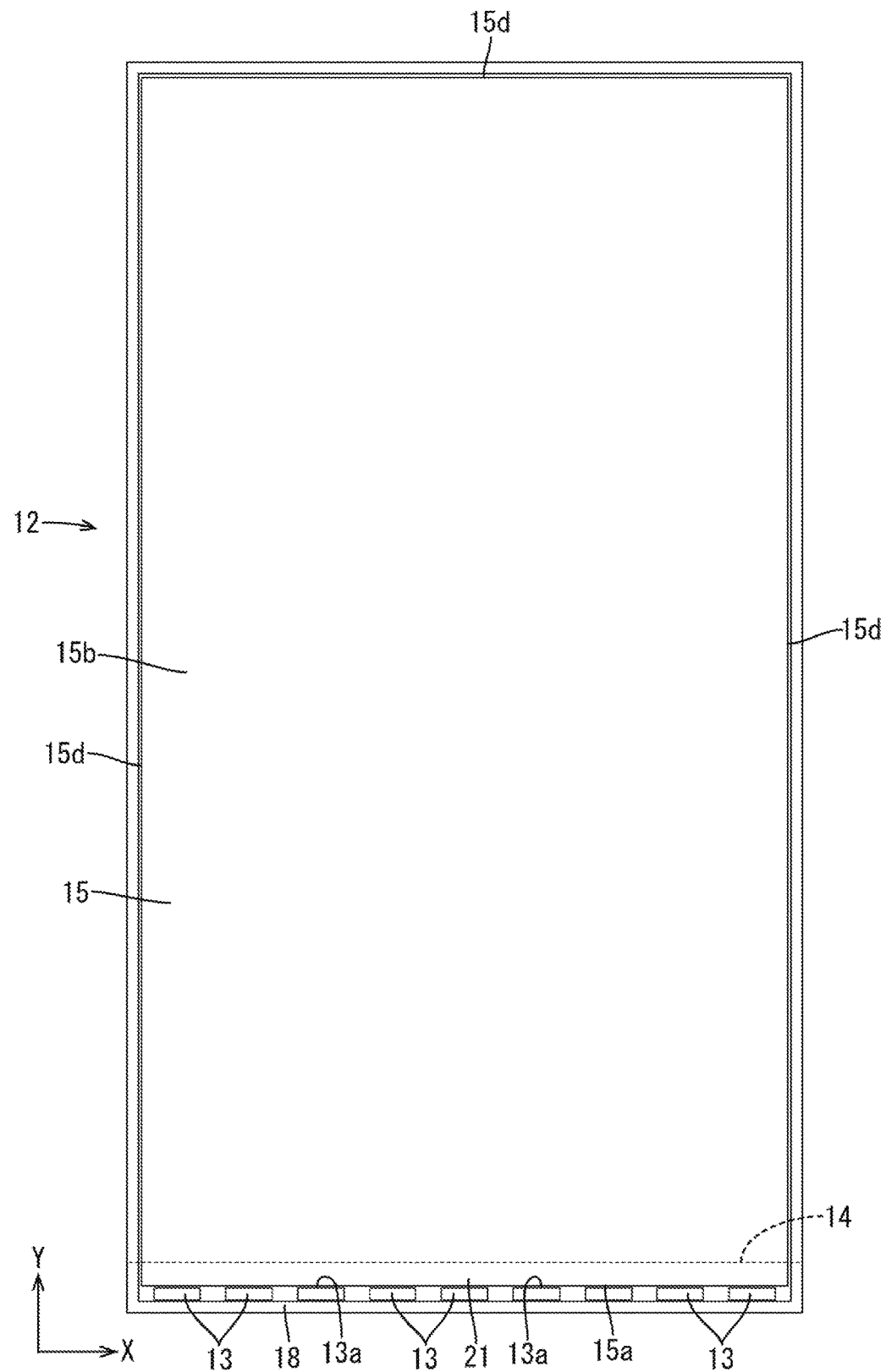
FIG. 4 is a plan view of a backlight device excluding an optical member.
Figure 5:
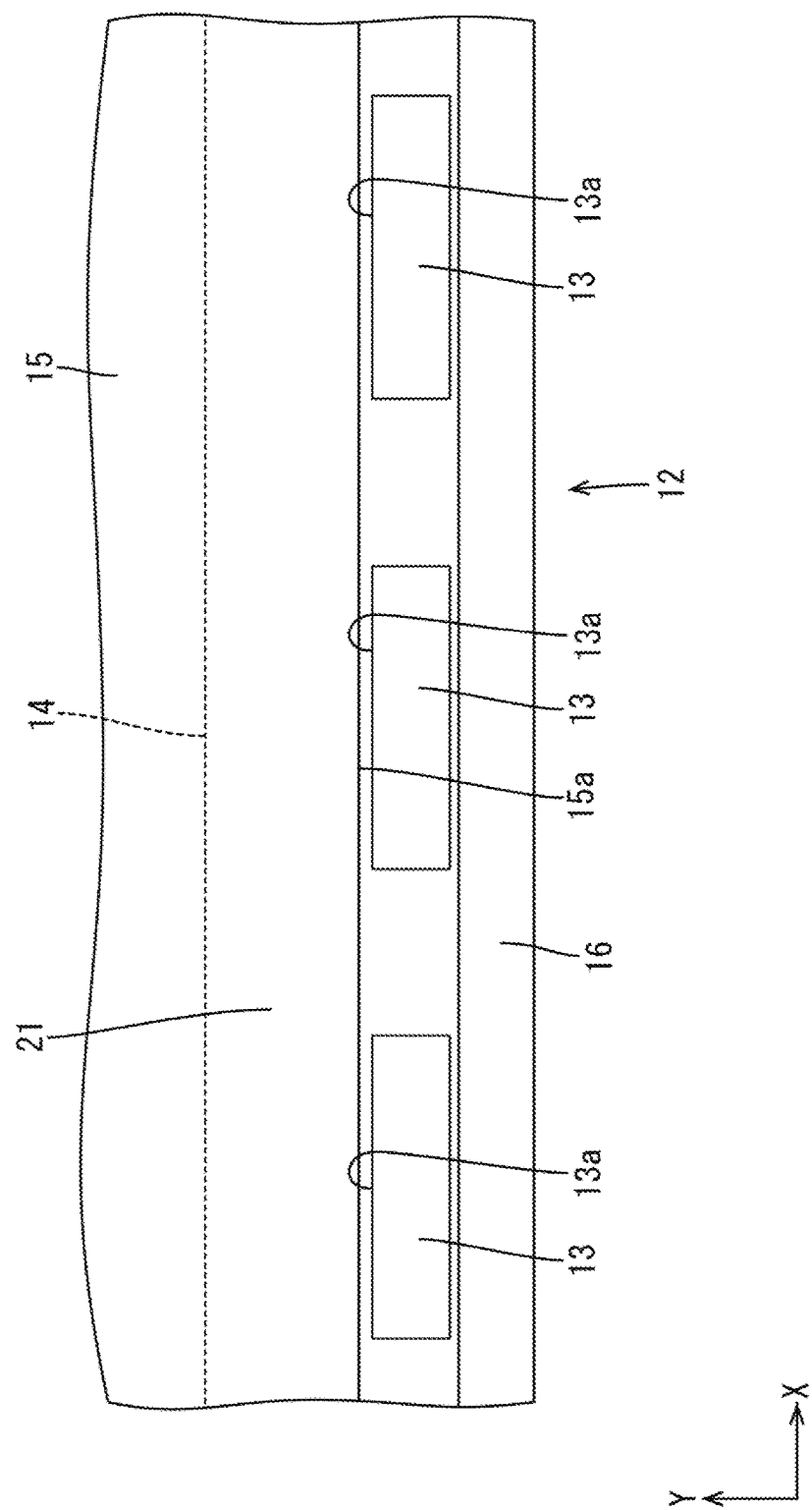
FIG. 5 is an enlarged plan view of the vicinity of the LED in FIG. 4.

As shown in FIGS. 1 and 4, the LED substrate 14 is formed so that the length dimension (long side dimension) is equal to or slightly larger than the short side dimension of the light guide plate 15, to be described later, and the width dimension (short side dimension) is larger than a distance (spacing) between a light entering end surface 15a of the light guide plate 15 and the frame 18. Therefore, as shown in FIGS. 3 and 5, the LED substrate 14 has one end in the width direction (short side direction, Y axis direction) as a light guide plate overlapping section 14a that overlaps a section (a light entering-side edge section 21) of the light guide plate 15 when seen in a plan view, and the other end as a frame overlapping section (a rim-shaped member overlapping section) 14b that overlaps the frame 18 when seen in a plan view. That is, a section sandwiched between the light guide plate overlapping section 14a and the frame overlapping section 14b of the LED substrate 14 is an LED mounting section (light source mounting section) 14c on which the LED 13 is mounted. The LED 13 mounted on the LED mounting section 14c is arranged so as to be intermittently lined in plural numbers (nine in FIGS. 1 to 4) in the length direction (X axis direction) on the LED substrate 14, and the adjacent LEDs 13 are connected in series by the wiring pattern. The wiring pattern is mainly installed in the light guide plate overlapping section 14a, where a certain width dimension or more of the light guide plate overlapping section 14a is required to sufficiently ensure the arrangement space for the wiring pattern. Thus, the light guide plate overlapping section 14a is arranged to overlap an effective light exiting area EA. An array pitch between the adjacent LEDs 13 is substantially constant, that is, each LED 13 can be said as being arrayed at a substantially equal interval in the X axis direction. The frame overlapping section 14b and the light guide plate overlapping section 14a each has a band shape extending substantially linearly along the X axis direction. A power for turning ON each LED 13 is supplied from an LED drive circuit (not shown) to the LED substrate 14, and an extraction wiring portion (not shown) therefor is provided.

As shown in FIGS. 1 and 4, the light guide plate 15 has a rectangular plate shape one size smaller than an inner-dimension of the frame 18 when seen in a plan view, where a plate surface thereof is parallel to the plate surface of the liquid crystal panel 11 and the like, while a long side direction in the plate surface coincides with the Y axis direction, a short side direction coincides with the X axis direction, and a plate thickness direction orthogonal to the plate surface coincides with the Z axis direction. The light guide plate 15 is accommodated with its periphery surrounded by the frame 18, and is arranged at a position immediately below the liquid crystal panel 11 and the optical sheet 16. An end surface of the light guide plate 15 on the short side of the lower side shown in FIG. 4 of the outer peripheral end surface acts as a light entering end surface (light source opposing end surface) 15a which opposes the LED 13 and to which the light from the LED 13 enters, and each end surface on the other three sides (an end surface on the short side of the upper side shown in FIG. 4, and a pair of end surfaces on the long side) acts as an LED non-opposing end surface (light source non-opposing end surface) 15d that does not oppose the LED 13. An end (an end on the lower side shown in FIG. 4) including the light entering end surface 15a of the outer peripheral end of the light guide plate 15 is the light entering-side edge section 21. The light entering-side edge section 21 is arranged to overlap on the front side with respect to the light guide plate overlapping section 14a of the LED substrate 14. According to the position relationship of the light entering-side edge section 21 and the light guide plate overlapping section 14a of the LED substrate 14, the light guide plate overlapping section 14a of the LED substrate 14 is covered from the front side by the light entering-side edge section 21, and hence the light guide plate overlapping section 14a becomes difficult to be visually recognized by the user of the liquid crystal display device 10. Thus, even if the light guide plate overlapping section 14a of the LED substrate 14 greatly bulges out toward the effective light exiting area EA (display area) side as the narrowing of the frame of the liquid crystal display device 10 and the backlight device 12 advances, the light guide plate overlapping section 14a is less likely to be visually recognized as a dark portion, which is suitable in terms of narrowing the frame. The light from the LED 13 does not directly enter each LED non-opposing end surface 15d, but may indirectly enter thereto.

Of the pair of front and back plate surfaces of the light guide plate 15, the plate surface facing the front side (liquid crystal panel 11 side) is a light exiting plate surface 15b that exits light toward the liquid crystal panel 11, as shown in FIG. 2. The light exiting plate surface 15b of the light guide plate 15 is sectionalized to the effective light exiting area EA, which is a central side portion that effectively exits the light, and a non-effective light exiting area NEA, which is an outer peripheral side portion surrounding the effective light exiting area EA that cannot effectively exit the light. The effective light exiting area EA is an area, light through which exits to the display area of the liquid crystal panel 11 is effectively used to display an image, and disposed to overlap the display area when seen in a plan view. The non-effective light exiting area NEA is an area that overlaps the non-display area when seen in a plan view. On the contrary, the plate surface facing the back side in the light guide plate 15 is an opposite plate surface 15c on an opposite side of the light exiting plate surface 15b. According to such configuration, the lined direction of the LED 13 and the light guide plate 15 coincides with the Y axis direction, the lined direction of the optical sheet 16 (liquid crystal panel 11) and the light guide plate 15 coincides with the Z axis direction, and both lined directions are orthogonal to each other. The light guide plate 15 has a function of guiding the light emitted along the Y axis direction from the LED 13 from the light entering end surface 15a, raising the light so as to be directed toward the optical sheet 16 side (front side, light exiting side) while interiorly propagating the light, and exiting the light as a planar-light from the light exiting plate surface 15b, which is the plate surface on the front side. On the opposite plate surface 15c of the light guide plate 15, a light reflection pattern (not shown) including a light reflecting portion for reflecting the light in the light guide plate 15 toward the light exiting plate surface 15b to urge the light to exit from, the light exiting plate surface 15b is formed. The light reflecting portion configuring the light reflection pattern includes a great number of light reflection dots, of which a distribution density changes according to a distance from the light entering end surface 15a (LED 13). Specifically, the distribution density of the light reflection dots configuring the light reflecting portion tends to be higher as it is farther away from the light entering end surface 15a in the Y axis direction, and lower as it is closer to the light entering end surface 15a, so that the exit light from the light exiting plate surface 15b is controlled to be a uniform distribution in a plane.

As shown in FIGS. 1 and 2, the reflection sheet 17 is arranged to cover the back side of the light guide plate 15, that is, the opposite plate surface 15c on the opposite side of the light exiting plate surface 15b. The reflection sheet 17 includes a sheet material made from white synthetic resin of which a front surface excels in light reflecting property, and thus can efficiently raise the light propagating through the light guide plate 15 toward the front side (light exiting plate surface 15b). The reflection sheet 17 has a rectangular shape when seen in a plan view, similarly to the light guide plate 15, where a central side portion is arranged to overlap the back side (opposite side from, optical sheet 16 side) with respect to the light guide plate 15.

Figure 6:
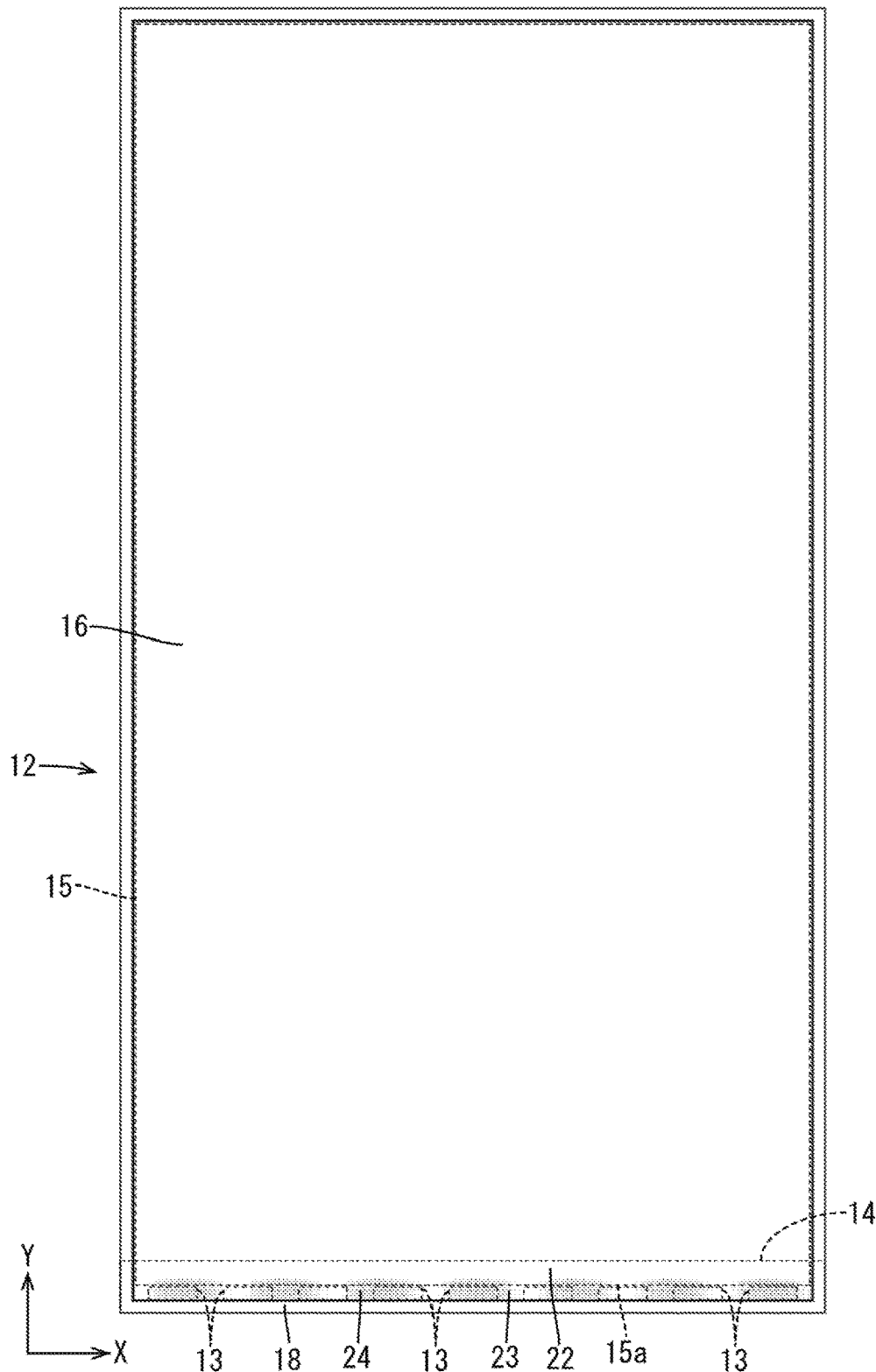
FIG. 6 is a plan view of the backlight device.

As shown in FIGS. 1 and 2, the optical sheet 16 has a rectangular sheet when, seen in a plan view, similarly to the light guide plate 15. The plate surface of the optical sheet 16 is parallel to the plate surfaces of the liquid crystal panel 11, the LED substrate 14, and the light guide plate 15, while the long side direction, in the plate surface coincides with the Y axis direction, the short side direction coincides with the X axis direction, and the plate thickness direction orthogonal to the plate surface coincides with the Z axis direction. The optical sheet 16 is placed on the front side of the light exiting plate surface 15b of the light guide plate 15 and interposed between the liquid crystal panel 11 and the light guide plate 15, thus allowing the exit light from the light guide plate 15 to transmit therethrough and exit the light toward the liquid crystal panel 11 while applying a predetermined optical action on the transmitted light. As shown in FIGS. 2 and 6, a large portion of the optical sheet 16 overlaps the light guide plate 15 when seen in a plan view, and a section that overlaps the light entering-side edge section 21 is assumed as a light entering-side edge section overlapping section 22. The light entering-side edge section overlapping section 22 has a band shape extending along the X axis direction. The optical sheet 16 includes an extended portion 23 extending from the light entering-side edge section overlapping section 22 toward the LED 13 along the Y axis direction. The extended portion 23 is a portion projecting toward the LED 13 farther than the light entering end surface 15a of the light guide plate 15 in the optical sheet 16, and a boundary position of the extended portion 23 and the light entering-side edge section overlapping section 22 coincides with the light entering end surface 15a. The extended portion 23 is arranged to overlap and cover the LED 13 from the front side.

In the present embodiment, as shown in FIGS. 1 and 2, the optical sheet 16 has three sheets stacked mutually, and specifically, a sheet arranged on the most back side and directly stacked on the light exiting plate surface 15b of the light guide plate 15 is a diffuser sheet 16a, a sheet stacked on the front side thereof is a first prism sheet 16b, and a sheet further stacked on the front side is a second prism sheet 16c. The diffuser sheet 16a is configured with a great number of diffusing particles dispersed in a base member, and has a function of diffusing the transmitting light. The first prism sheet 16b and the second prism sheet 16c each include a base member, and a prism portion in which unit prisms, which are arranged on the plate surface on the front side in the base member to extend along the X axis direction or the Y axis direction, are lined along the Y axis direction or the X axis direction, and selectively applies a light collecting action on the lined direction of the unit prisms by refracting the transmitting light with the unit prisms configuring the prism portion. The first prism sheet 16b is in a relationship in which the extending direction and the lined direction of the unit prisms are orthogonal to the extending direction and the lined direction of the unit prisms of the second prism sheet 16c.

The frame 18 is made from, synthetic resin, and as shown, in FIGS. 1 and 4, has an outer shape formed to a rectangular rim shape one size larger than the light guide plate 15, and is arranged so as to collectively surround the LEDs 13, the light guide plate 15, and the optical sheets 16 from the outer peripheral side. The frame 18 is configured by mutually connecting a pair of long side portions extending along the Y axis direction and a pair of short side portions extending along the X axis direction. Of the pair of short side portions configuring the frame 18, one of the short side portions overlaps a section (a frame overlapping section 14b) of the LED substrate 14 when seen, in a plan view, as shown in FIGS. 3 and 5.

The frame 18 configured as above is fixed with respect to the liquid crystal panel 11 with a panel fixing member 19, as shown in FIGS. 1 and 2. The panel fixing member 19 has a front surface that presents black, and has high light absorbing property and high light blocking property. The panel fixing member 19 has a rectangular rim shape when seen in a plan view, similarly to the frame 18, and defines the effective light exiting area EA in the light exiting plate surface 15b of the light guide plate 15. That is, the panel fixing member 19 is arranged to overlap the non-effective light exiting area NEA in the light exiting plate surface 15b of the light guide plate 15 when seen in a plan view. The panel fixing member 19 is of a double-sided securely attaching type in which an adhesive material is applied on both front and back surfaces of the base member. Although the base member itself of the panel fixing member 19 is preferably made from a black material (black PET etc.), the base member may be made from a white material or a transparent material, and a black paint may be printed on the front surface thereof. The panel fixing member 19 is arranged to be interposed between the frame 18 and the liquid crystal panel 11 in the Z axis direction. The adhesive material on the back side of the base member is securely attached to the surface on the front side of the frame 18 and the adhesive material on the front side of the base member is securely attached to the plate surface on the back side of the liquid crystal panel 11. The panel fixing member 19 is also arranged to be interposed between the optical sheet 16 and the liquid crystal panel 11 in the Z axis direction, and is also fixed with respect to the optical sheet 16 (specifically, second prism sheet 16c arranged on the most front side). Furthermore, the LED substrate 14 and the reflection sheet 17 are fixed to the frame 18 by a frame fixing member 20. The frame fixing member 20 has a rectangular rim shape when seen in a plan view, similarly to the frame 18, and is of a double-sided securely attaching type in which an adhesive material is applied on both front and back surfaces of the base member. The frame fixing member 20 is arranged to be interposed between the frame 18 and the outer peripheral end of the frame overlapping section 14b of the LED substrate 14 and the reflection sheet 17 in the Z axis direction. The adhesive material on the back side of the base member is securely attached to the plate surface on the front side of the outer peripheral end of the frame overlapping section 14b and the reflection sheet 17, and the adhesive material on the front side of the base member is securely attached to the surface on the back side of the frame 18.

In the backlight device 12 having the configuration described above, not all the light emitted from the LED 13 enters the light entering end surface 15a of the light guide plate 15, and some may directly advance toward the light entering-side edge section overlapping section 22 and the extended portion 23 of the optical sheet 16 without passing the light guide plate 15. When the light enters the light entering-side edge section overlapping section 22 and the extended portion 23, the light may be propagated through the optical sheet 16 and exit from the effective light-exiting area EA, in which case, there is a possibility that a locally bright portion may be visually recognized at the portion on the LED 13 side of the effective light exiting area EA.

Figure 7:
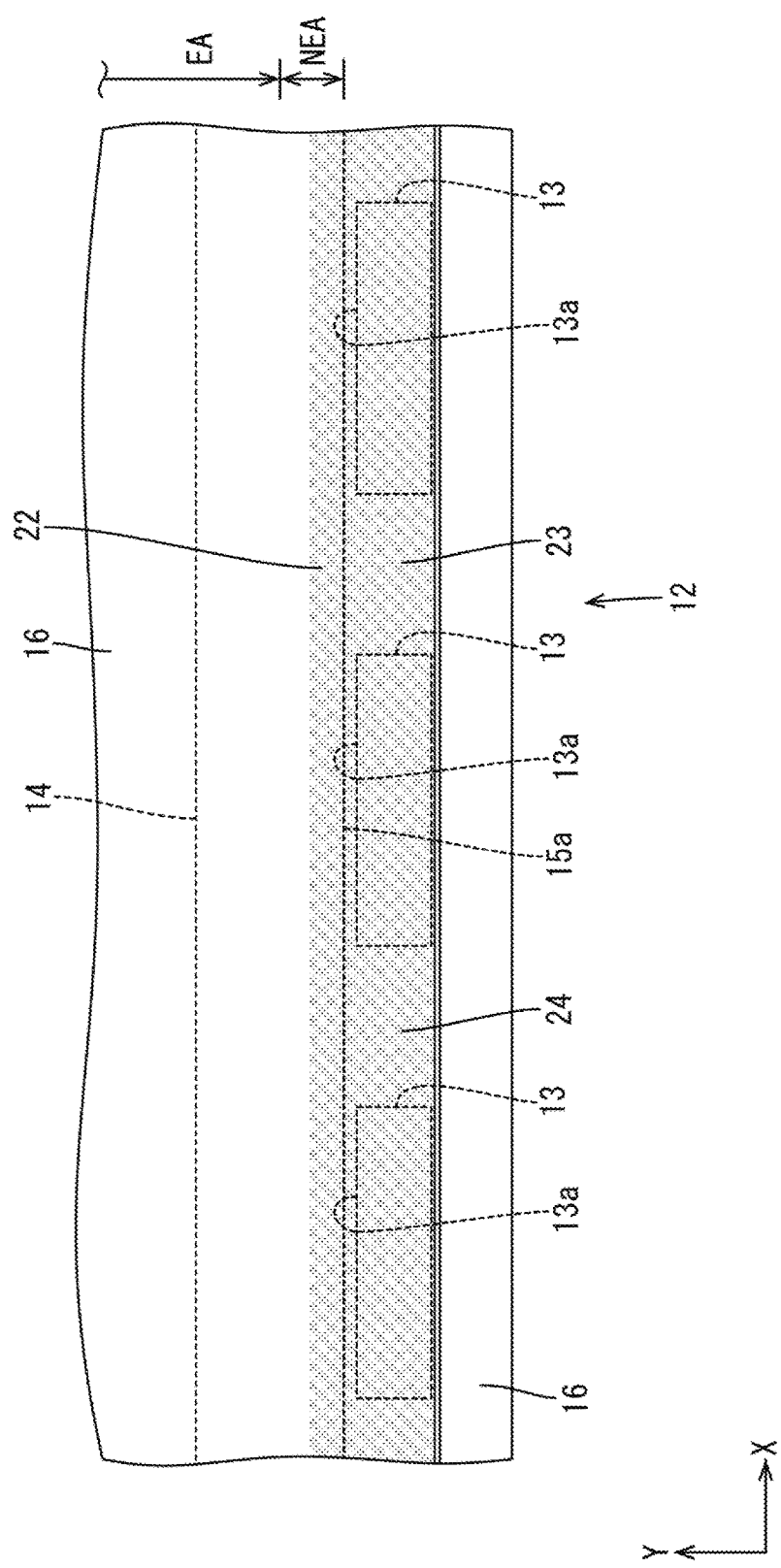
FIG. 7 is an enlarged plan view of the vicinity of the LED in FIG. 6.

On the contrary, the optical sheet 16 according to the present embodiment includes one that has a low light-transmissive member 24, which has a lower light transmissivity than other portions and is arranged so as to cross at least the light entering-side edge section overlapping section 22 and the extended portion 23, as shown in FIGS. 3 and 7. According to such configuration, even if the light emitted from the LED 13 includes light directly advancing toward the light entering-side edge section overlapping section 22 and the extended portion 23 of the optical sheet 16 without passing the light guide plate 15, the light is less likely to be transmitted through the light entering-side edge section overlapping section 22 and the extended portion 23 by the low light-transmissive member 24. Thus, occurrence of uneven brightness in which a local bright portion is visually recognized in the vicinity of the LED 13 of the light guide plate 15 is suitably suppressed. If the occurrence of uneven brightness is suppressed in the vicinity of the LED 13 of the light guide plate 15, a range where the light exit from the light exiting plate surface 15b can be effectively used becomes wider, which is suitable in narrowing the frame of the backlight device 12. The low light-transmissive member 24 is thus arranged to overlap the light guide plate overlapping section 14a of the LED substrate 14 when seen in a plan view, and hence it is more suitable in narrowing the frame of the backlight device 12 compared to when the LED substrate is arranged to overlap the light exiting plate surface 15b side with respect to the light guide plate 15 and the light guide plate overlapping section of the LED substrate and the low light-transmissive member are arranged not to overlap and are arranged side by side in the non-effective light exiting area NEA as in the conventional art. Furthermore, as the low light-transmissive member 24 is extended from the light entering-side edge section overlapping section 22 to the extended portion 23 of the optical sheet 16, it overlaps the light guide plate overlapping section 14a and the LED mounting section 14c (each LED 13) of the LED substrate 14 when seen in a plan view, and is also arranged to overlap the light entering-side edge section 21 of the light guide plate 15 when seen in a plan view. In FIGS. 6 and 7, a forming range of the low light-transmissive member 24 in the optical sheet 16 is illustrated in a shaded form.

Specifically, as shown in FIG. 3, the low light-transmissive member 24 is arranged on the most back side, that is, on the diffuser sheet 16a closest to the light guide plate 15 of the three optical sheets 16. The low light-transmissive member 24 is arranged on the plate surface on the back side, that is, the plate surface on the light guide plate 15 side of the front and back plate surfaces of the diffuser sheet 16a. The low light-transmissive member 24 includes a light blocking layer that presents black and has high light absorbing property and high light blocking property, and is formed by printing or applying a light blocking paint on the front surface of the diffuser sheet 16a. Thus, the light transmissivity of the low light-transmissive member 24 is, for example, in a range of 0% to 30%, and most preferably substantially 0%, which is lower than the light transmissivity in the diffuser sheet 16a. According to such configuration, even if the light emitted from the LED 13 includes light directly advancing toward the light entering-side edge section overlapping section 22 and the extended portion 23 of the optical sheet 16 without passing the light guide plate 15, the light is blocked by being absorbed by the low light-transmissive member 24 formed on the plate surface on the light guide plate 15 side of the diffuser sheet 16a closest to the light guide plate 15, and hence the entering of light with respect to the light entering-side edge section overlapping section 22 and the extended portion 23 of the diffuser sheet 16a is regulated. Thus, the entering of light to the diffuser sheet 16a without passing the light guide plate 15 is of course prevented, and the entering of light to the first prism sheet 16b and the second prism sheet 16c stacked on the front side with respect to the diffuser sheet 16a without passing the light guide plate 15 is also prevented.

As shown in FIG. 6, the low light-transmissive member 24 is arranged in a form of extending in a band shape over the entire length in the short side direction at, the diffuser sheet 16a. That is, the low light-transmissive member 24 is arranged over the entire region of the light entering-side edge section overlapping section 22 and the extended portion 23 of the diffuser sheet 16a. A preferred width of the light entering-side edge section overlapping section 22 of the diffuser sheet 16a is, for example, in a range of greater than or equal to 0.2 mm and smaller than or equal to 1 mm. If the width of the light entering-side edge section overlapping section 22 is smaller than 0.2 mm, the light entering-side edge section overlapping section 22 may not overlap the light entering-side edge section 21 of the light guide plate 15 depending on a dimensional tolerance at the time of assembly, and the entering of light to the diffuser sheet 16a without passing the light guide plate 15 may not be prevented, whereas if the width of the light entering-side edge section overlapping section 22 is greater than or equal to 0.2 mm, a reliability of the light entering-side edge section overlapping section 22 overlapping the light entering-side edge section 21 of the light guide plate 15 at the time of assembly becomes sufficiently high and the reliability of preventing entering of light to the diffuser sheet 16a without passing the light guide plate 15 becomes sufficiently high. If the width of the light entering-side edge section overlapping section 22 is equal to or less than 1 mm, the frame in the liquid crystal display device 10 becomes excessively thick and thus the designability is impaired, but if the width of the light entering-side edge section overlapping section 22 is greater than or equal to 1 mm, the frame in the liquid crystal display device 10 is maintained sufficiently narrow and the designability is avoided from being impaired. As shown in FIGS. 3 and 7, the low light-transmissive member 24 is arranged such that the entire region is on the outside of the effective light exiting area EA and overlaps the non-effective light exiting area NEA when seen in a plan view. That is, the low light-transmissive member 24 is arranged to selectively overlap the non-effective light exiting area NEA, out of the effective light exiting area EA and the non-effective light exiting area NEA. Furthermore, the low light-transmissive member 24 is arranged such that an inner end position thereof is on the outer side of an inner end position of the non-effective light exiting area NEA (an outer end position of the effective light exiting area EA). In other words, the low light-transmissive member 24 is arranged such that the inner end position thereof is on the outer side of the inner end position of the panel fixing member 19. According to such configuration, the low light-transmissive member 24 is less likely to be visually recognized as the dark portion by the user of the liquid crystal display device 10, which is more suitable in terms of suppressing the uneven brightness.

The present embodiment has a structure described above, and the operations thereof will now be described. When a power source of the liquid crystal display device 10 is turned ON, a signal related to an image is provided from the signal providing source to the liquid crystal panel 11, and power is supplied from the LED drive circuit substrate to each LED 13 on the LED substrate 14, whereby each LED 13 is turned ON. As shown in FIG. 2, the light emitted from, each LED 13 is guided by the light guide plate 15 and transmitted through the optical sheet 16 to be converted to a uniform, planar light and then irradiated on the liquid crystal, panel 11, whereby a predetermined image is displayed in a display area of the liquid crystal panel 11.

Describing the operations related to the backlight device 12 in detail, when, each LED 13 is turned ON, the light exit from each LED 13 is entered, to the light entering end surface 15a of the light guide plate 15, and thereafter, in a course of being totally reflected at an interface with an external air layer in the light guide plate 15 or propagated through the light guide plate 15 by being reflected by the reflection sheet 17 and the like, exit from the light exiting plate surface 15b and irradiated toward the optical sheet 16, as shown in FIG. 3. Not all the light emitted from the LED 13 enters the light entering end surface 15a of the light guide plate 15, and some may directly advance toward the light entering-side edge section overlapping section 22 and the extended portion 23 of the optical sheet 16 without passing the light guide plate 15. On the other hand, as the diffuser sheet 16a configuring the optical sheet 16 is provided with the low light-transmissive member 24, which has a lower light transmissivity than the other portions and is arranged so as to cross the light entering-side edge section overlapping section 22 and the extended portion 23, even if the light emitted from the LED 13 includes light directly advancing toward the light entering-side edge section overlapping section 22 and the extended portion 23 of the optical sheet 16 without passing the light guide plate 15, the light is less likely to be transmitted through the light entering-side edge section overlapping section 22 and the extended portion 23 by the low light-transmissive member 24. Furthermore, as the low light-transmissive member 24 includes the light blocking layer formed on the plate surface on the back side of the diffuser sheet 16a closest to the light guide plate 15 of the optical sheets 16, the light advancing toward the light entering-side edge section overlapping section 22 and the extended portion 23 of the diffuser sheet 16a is blocked and the entering of light with respect to the diffuser sheet 16a is prevented, and furthermore, the entering of light to the first prism sheet 16b and the second prism sheet 16c on the front side is also prevented. Therefore, the occurrence of uneven brightness in which a local bright portion is visually recognized in the vicinity of the LED 13 of the light guide plate 15 is suitably suppressed.

As described above, the backlight device (lighting device) 12 of the present embodiment includes the LED (light source) 13, the light guide plate 15 in which a part of the outer peripheral end surface is the light entering end surface 15a to which the light from the LED 13 enters, one of the pair of plate surfaces is the light exiting plate surface 15b from which the light exits and the other of the pair of plate surfaces is the opposite plate surface 15c, the LED substrate (light source substrate) 14 on which the LED 13 is mounted and at least a part of which is arranged to overlap the opposite plate surface 15c side with respect to the light entering-side edge section 21 that is the end on the light entering end surface 15a side of the light guide plate 15, the optical sheet (optical member) 16 including the light entering-side edge section overlapping section 22 arranged on the light exiting plate surface 15b side with respect to the light guide plate 15 and overlapped with the light entering-side edge section 21, and the low light-transmissive member 24 arranged on at least the light entering-side edge section overlapping section 22 of the optical sheet 16 and having a lower light transmissivity than other portions of the optical sheet 16.

Thus, the light from the LED 13 enters the light entering end surface 15a of the light guide plate 15 to be propagated through the light guide plate 15, then exit from the light exiting plate surface 15b, and thereafter, exit to the outside while being applied with an optical action by the optical sheet 16. The LED substrate 14 on which the LED 13 is mounted has at least a part arranged to overlap the opposite plate surface 15c side with respect to the light entering-side edge section 21 of the light guide plate 15. Therefore, even if the narrowing of the frame of the backlight device 12 is advanced, the portion overlapping the light entering-side edge section 21 of the light guide plate 15 of the LED substrate 14 is less likely to be visually recognized as the dark portion compared to when a part of the LED substrate 14 is arranged to overlap the light exiting plate surface 15b side with respect to the light entering-side edge section 21 of the light guide plate 15, and thus it is suitable in narrowing the frame of the backlight device 12.

Of the optical sheets 16 arranged on the light exiting plate surface 15b side with respect to the light guide plate 15, the low light-transmissive member 24 having a light transmissivity lower than that of the other sections of the optical sheet 16 is arranged in the light entering-side edge section overlapping section 22 that overlaps at least the light entering-side edge section 21 of the light guide plate 15, and thus even if the light emitted from the LED 13 includes light directly advancing toward the light entering-side edge section overlapping section 22 of the optical sheet 16 without passing the light guide plate 15, the light is less likely to be transmitted through the light entering-side edge section overlapping section 22 by the low light-transmissive member 24. Thus, occurrence of uneven brightness in which a local bright portion is visually recognized in the vicinity of the LED 13 of the light guide plate 15 is suitably suppressed. If the occurrence of uneven brightness is suppressed in the vicinity of the LED 13 of the light guide plate 15, the range in which the light exit from the light exiting plate surface 15b can be effectively used becomes wider, which is suitable in narrowing the frame of the backlight device 12. Furthermore, the LED substrate 14, at least a part of which overlaps the opposite plate surface 15c side with respect to the light entering-side edge section 21 of the light guide plate 15, is arranged to overlap the low light-transmissive member 24 arranged on the light entering-side edge section overlapping section 22 of the optical sheet 16, and thus it is more suitable in narrowing the frame of the backlight device 12 compared to when the LED substrate 14 and the low light-transmissive member 24 are arranged not to overlap.

Furthermore, the optical sheet 16 includes the extended portion 23 extending from the light entering-side edge section overlapping section 22 toward the LED 13 and a section that overlaps the LED 13, and the low light-transmissive member 24 is arranged to extend from, at least the light entering-side edge section overlapping section 22 to the extended portion 23. Therefore, even if the light emitted from the LED 13 includes light directly advancing toward the light entering-side edge section overlapping section 22 and the extended portion 23 of the optical sheet 16 without passing the light guide plate 15, the light is less likely to be transmitted through the light entering-side edge section overlapping section 22 and the extended portion 23 by the low light-transmissive member 24, and thus the local bright portion is more unlikely to be visually recognized in the vicinity of the LED 13 of the light guide plate 15.

Moreover, the low light-transmissive member 24 is arranged on the surface on the light guide plate 15 side in the optical sheet 16. Thus, compared to when the low light-transmissive member 24 is arranged on the surface on the opposite side from the light guide plate 15 side in the optical sheet 16, the entering of light to the optical sheet 16 is suitably suppressed by the low light-transmissive member 24.

Furthermore, the optical sheet 16 is arranged in plural so as to overlap each other, and the low light-transmissive member 24 is arranged on the optical sheet closest to the light guide plate 15 of the optical sheets 16. Therefore, even if the light emitted from, the LED 13 includes light directly advancing toward the light entering-side edge section overlapping section. 22 of the optical sheets 16 without passing the light guide plate 15, the light is suppressed from, entering the light entering-side edge section overlapping section 22 by the low light-transmissive member 24 arranged on the surface on the light guide plate 15 side in the optical sheet 16 closest to the light guide plate 15. Thus, the entering of light to the optical sheets 16 without passing the light guide plate 15 is suitably suppressed, and hence the occurrence of uneven brightness can be more suitably suppressed.

When the light exiting plate surface 15b is sectionalized to the effective light exiting area EA from which the light is effectively exit and the non-effective light exiting area NEA surrounding the effective light exiting area EA, the low light-transmissive member 24 is arranged to selectively overlap the non-effective light exiting area NEA. Thus, when the low light-transmissive member 24 is arranged to overlap the non-effective light exiting area NEA in the light exiting plate surface 15b, the low light-transmissive member 24 is less likely to be visually recognized, and it is suitable in suppressing the uneven brightness.

Furthermore, the low light-transmissive member 24 is two-dimensionally arranged on the outer side of the inner end position in the non-effective light exiting area NEA. Thus, the low light-transmissive member 24 is more unlikely to be visually recognized, and it is more suitable in suppressing the uneven brightness.

Furthermore, the low light-transmissive member 24 includes the light blocking layer stacked with respect to the optical sheet 16. Thus, the light directly advancing from the LED 13 to the light entering-side edge section overlapping section 22 of the optical sheet 16 without passing the light guide plate 15 can be blocked by the light blocking layer, which is the low light-transmissive member 24, so that the light can be avoided from entering the light entering-side edge section overlapping section 22. It is thus more suitable in suppressing the occurrence of uneven brightness.

Furthermore, the liquid crystal display device (display device) 10 according to the present embodiment includes the backlight device 12 described above, and the liquid crystal panel (display panel) 11 that carries out displaying using the light from the backlight device 12. The liquid crystal display device 10 having such configuration excels in designability and the like as the frame of the backlight device 12 is narrowed.

Second Embodiment

A second embodiment of the present invention will be described according to FIG. 8. In the second embodiment, a forming range of a low light-transmissive member 124 is changed. Redundant description on the structure, the operation, and the effect similar to the first embodiment will be omitted.

Figure 8:
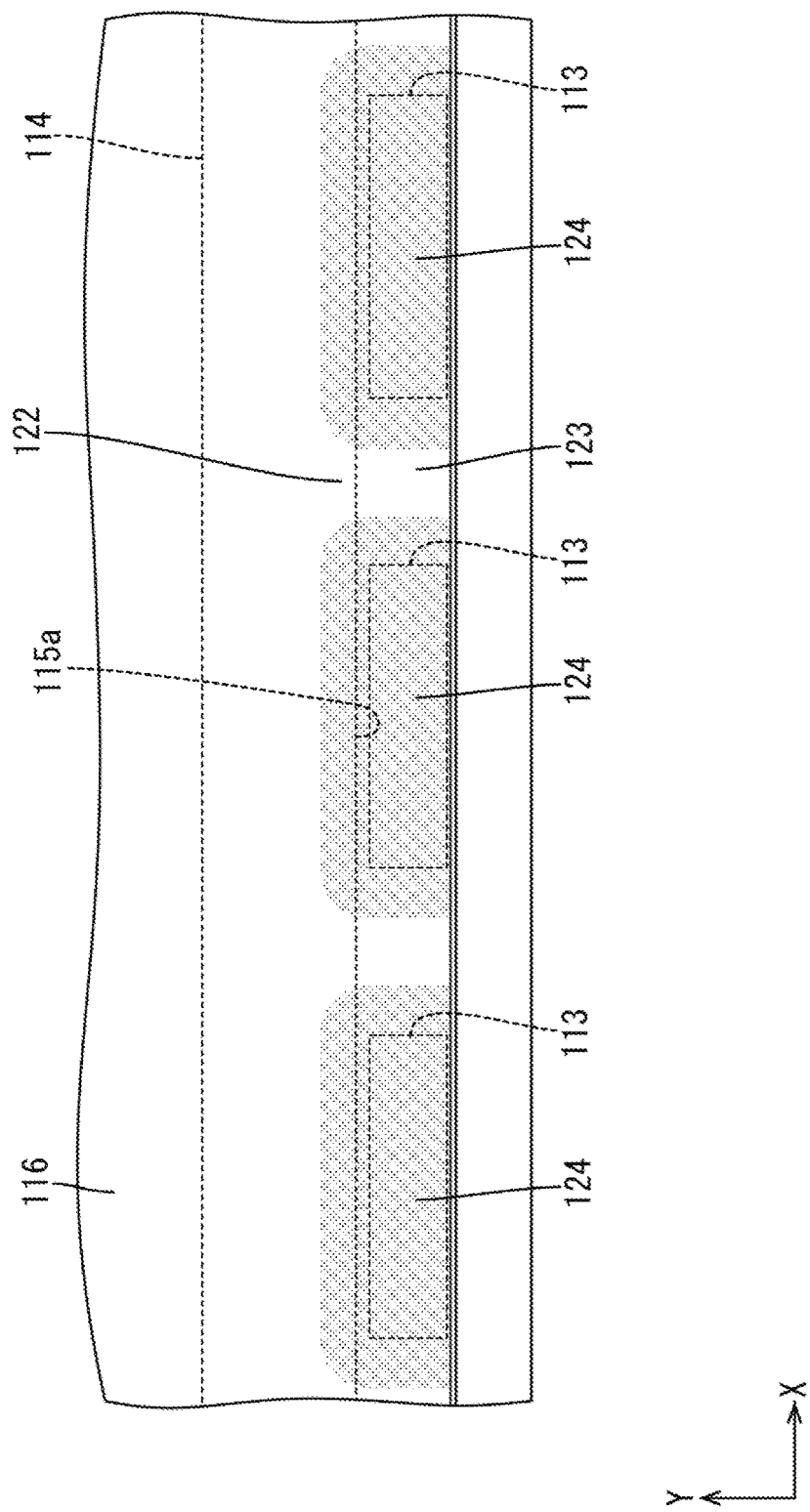
FIG. 8 is an enlarged plan view of the vicinity of an LED in a backlight device according to a second embodiment of the present invention.

As shown in FIG. 8, the low light-transmissive member 124 according to the present embodiment is arranged so as to be lined in plural at positions overlapping respective LEDs 113 in the X axis direction (the length direction of a light entering end surface 115a), which is the lined direction of the LEDs 113 in the optical sheet 116. That is, the low light-transmissive members 124 are arranged so as to be intermittently lined in the X axis direction, similarly to the arrangement of the LEDs 113 in the LED substrate 114. A forming range of the low light-transmissive member 124 in the optical sheet 116 seen in a plan view is wider than the forming range of the LED 113 seen in a plan view. The low light-transmissive member 124 is arranged to cross a light entering-side edge section overlapping section 122 (an upper side portion shown in FIG. 8 with respect to the light entering end surface 115a) and an extended portion 123 (a lower side portion shown in FIG. 8 with respect to the light entering end surface 115a) in the optical sheet 116, where the dimension in the X axis direction at the portion arranged on the extended portion 123 is constant and the dimension in the X axis direction at the portion arranged on the light entering-side edge section overlapping section 122 becomes smaller as it is farther away from the LED 113. The portion arranged on the extended portion 123 in the low light-transmissive member 124 has a planar shape of a horizontally long square shape one size larger than the LED 113, whereas the portion arranged on the light entering-side edge section overlapping section 122 has a planar shape of a horizontally long square shape with the corners rounded to an arc like shape.

Comparing a portion overlapping the LED 113 in the X axis direction and a portion not overlapping the LED 113, a light quantity related to the light directly advancing toward the light entering-side edge section overlapping section 122 and the extended portion 123 of the optical sheet 116 without passing the light guide plate 115 of the light emitted from the LED 113 tends to be greater at the former portion than the latter portion. With regards to this, each low light-transmissive member 124 is selectively arranged at a position overlapping each LED 113 in the X axis direction in the optical sheet 116, that is, at a position where the light quantity becomes large, and thus the transmittance of light emitted from the LED 113 and directly advancing toward the light entering-side edge section overlapping section 122 and the extended portion 123 of the optical sheet 116 without passing the light guide plate 115 can be effectively suppressed and the occurrence of uneven brightness can be suitably suppressed. Each low light-transmissive member 124 is not arranged at a position not overlapping each LED 113 in the X axis direction in the optical sheet 116, but the uneven brightness is less likely to essentially occur as such a position is a position where the light quantity is small. As each low light-transmissive member 124 is not arranged at the position not overlapping each LED 113 in the X axis direction in the optical sheet 116, an event in which the light is excessively absorbed by the low light-transmissive member 124 is less likely to occur, and lowering in brightness can be suppressed.

According to the present embodiment described above, the LEDs 113 are arranged so as to be lined along the length direction of the light entering end surface 115a, and the low light-transmissive members 124 are arranged so as to be lined at positions overlapping the LEDs 113 in the length direction of the optical sheet 116. Thus, the transmittance of light directly advancing from the LED 113 toward the light entering-side edge section overlapping section 122 of the optical sheet 116 without passing the light guide plate 115 is effectively suppressed by the low light-transmissive members 124 arranged at positions overlapping the LEDs 113 in the length direction of the light entering end surface 115a of the optical sheet 116, so that the occurrence of uneven brightness is suitably suppressed. At the position not overlapping the LEDs 113 in the length direction of the light entering end surface 115a of the light entering-side edge section overlapping section 122, the light quantity directly irradiated from the LED 113 without passing the light guide plate 115 is assumed to be essentially small, and thus the uneven brightness is less likely to occur. As the low light-transmissive member 124 is not arranged at the position not overlapping the LEDs 113 in the length direction of the light entering end surface 115a of the optical sheet 116, the light can be avoided from being excessively absorbed by the low light-transmissive member 124 and the like, and the lowering in brightness can be suppressed.

Third Embodiment

A third embodiment of the present invention will be described according to FIG. 9. In the third embodiment, a second frame fixing member 25 for fixing an optical sheet 216 to a frame 218 is additionally shown to that described in the first embodiment. Redundant description on the structure, the operation, and the effect similar to the first embodiment will be omitted.

Figure 9:
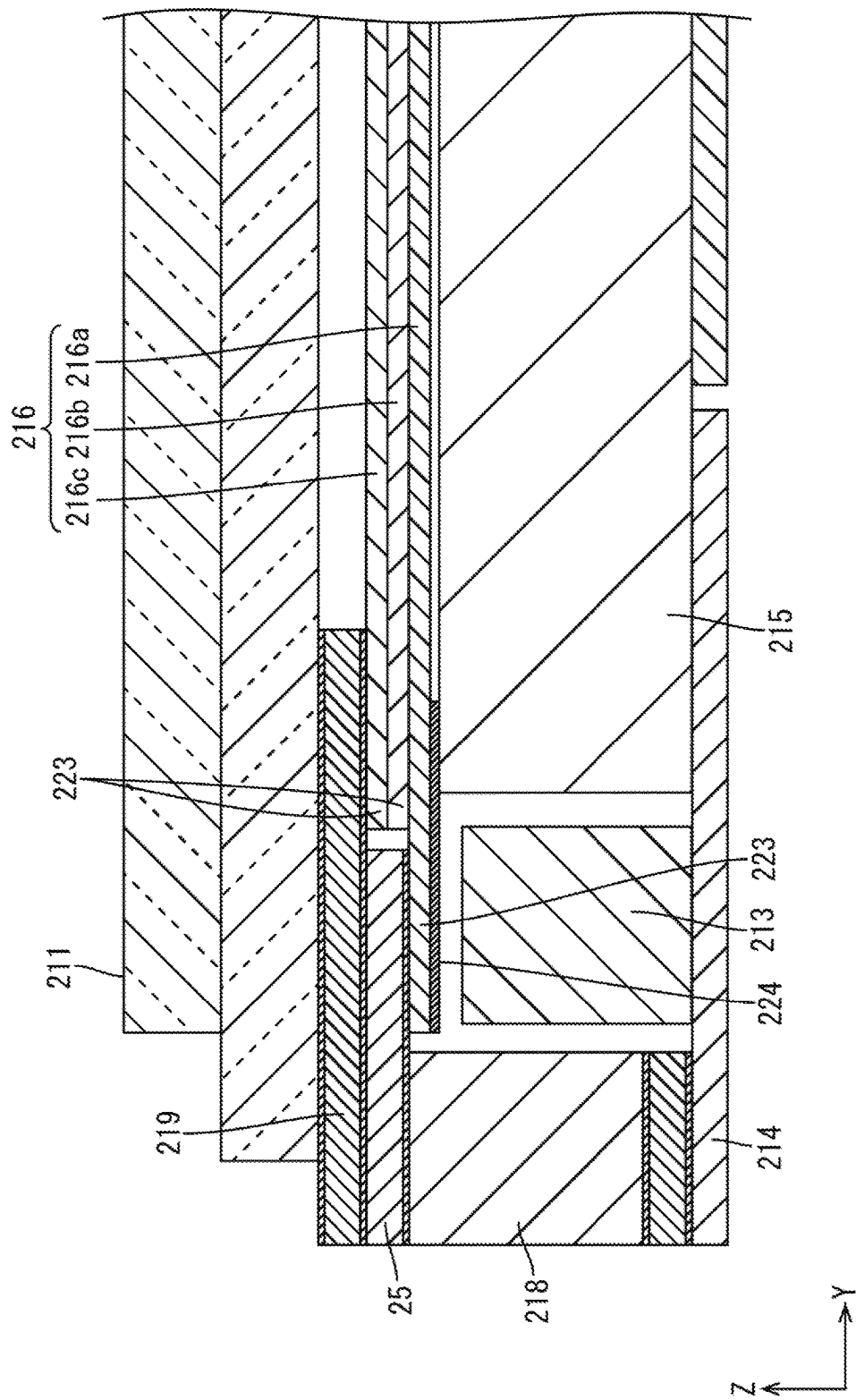
FIG. 9 is a side cross-sectional view of a liquid crystal display device according to a third embodiment of the present invention.

As shown in FIG. 9, a diffuser sheet 216a arranged with the low light-transmissive member 224 of the optical sheets 216 is fixed to the frame 218 according to the present embodiment by the second frame fixing member (frame fixing member) 25. The second frame fixing member 25 has the front surface presenting black, and has high light absorbing property and high light blocking property. The second frame fixing member 25 is a one-sided securely attaching type in which an adhesive material is applied only on a surface on the back side (opposite side of panel fixing member 219 side) in the base member, and is arranged to be interposed between the panel fixing member 219, and the frame 218 and the diffuser sheet 216a in the Z axis direction. Although the base member itself of the second frame fixing member 25 is preferably made from a black material (black PET etc.), the base member may made from a white material or a transparent material, and a black paint may be printed on the front surface thereof. The second frame fixing member 25 is arranged to cross the short side portion on an LED 213 side of the rim shaped frame 218 and an extended portion 223 in the diffuser sheet 216a, and has the adhesive material securely attached to both portions. An adhesive material on the back side in the panel fixing member 219 is securely attached to the surface on the front side of the base member in the second frame fixing member 25. Therefore, the frame 218 is fixed to the liquid crystal panel 211 by way of the second frame fixing member 25 and the panel fixing member 219. Furthermore, a first prism sheet 216b and a second prism sheet 216c of the optical sheet 216 have the extended portion 223 formed shorter than the diffuser sheet 216a to ensure an arrangement space of the second frame fixing member 25. Therefore, the second frame fixing member 25 has a thickness dimension of a size of about a sum of the thickness dimensions of the first prism, sheet 216b and the second prism sheet 216c. Thus, by fixing the diffuser sheet 216a arranged with the low light-transmissive member 224 to the frame 218 fixed with respect to the LED substrate 214, on which the LED 213 is mounted, by the second frame fixing member 25, the positioning of the low light-transmissive member 224 of the diffuser sheet 216a with respect, to the LED 213 is achieved, and the light transmission suppressing function by the low light-transmissive member 224 can be appropriately exerted. Furthermore, the occurrence of uneven brightness is suitably suppressed, and it is suitable in narrowing the frame.

According to the present embodiment described above, the frame 218 having a rim shape so as to surround the LED 213 and the light guide plate 215, and the second frame fixing member (frame fixing member) 25 for fixing the optical sheet 216 with respect to the frame 218 are arranged. In this manner, the optical sheet 216 is fixed to the frame 218 surrounding the LED 213 and the light guide plate 215 with the second frame fixing member 25. Therefore, the positioning of the optical sheet 216 with respect to the frame 218 is achieved, whereby the function of the low light-transmissive member 224 arranged on the optical sheet 216 can be appropriately exerted and the occurrence of uneven brightness can be suitably suppressed.

Fourth Embodiment

A fourth embodiment of the present invention will be described according to FIG. 10. In the fourth embodiment, the shape of a frame 318 and a forming range of a second frame fixing member 325 are changed from the third embodiment described above. Redundant description on the structure, the operation, and the effect similar to the third embodiment will be omitted.

Figure 10:
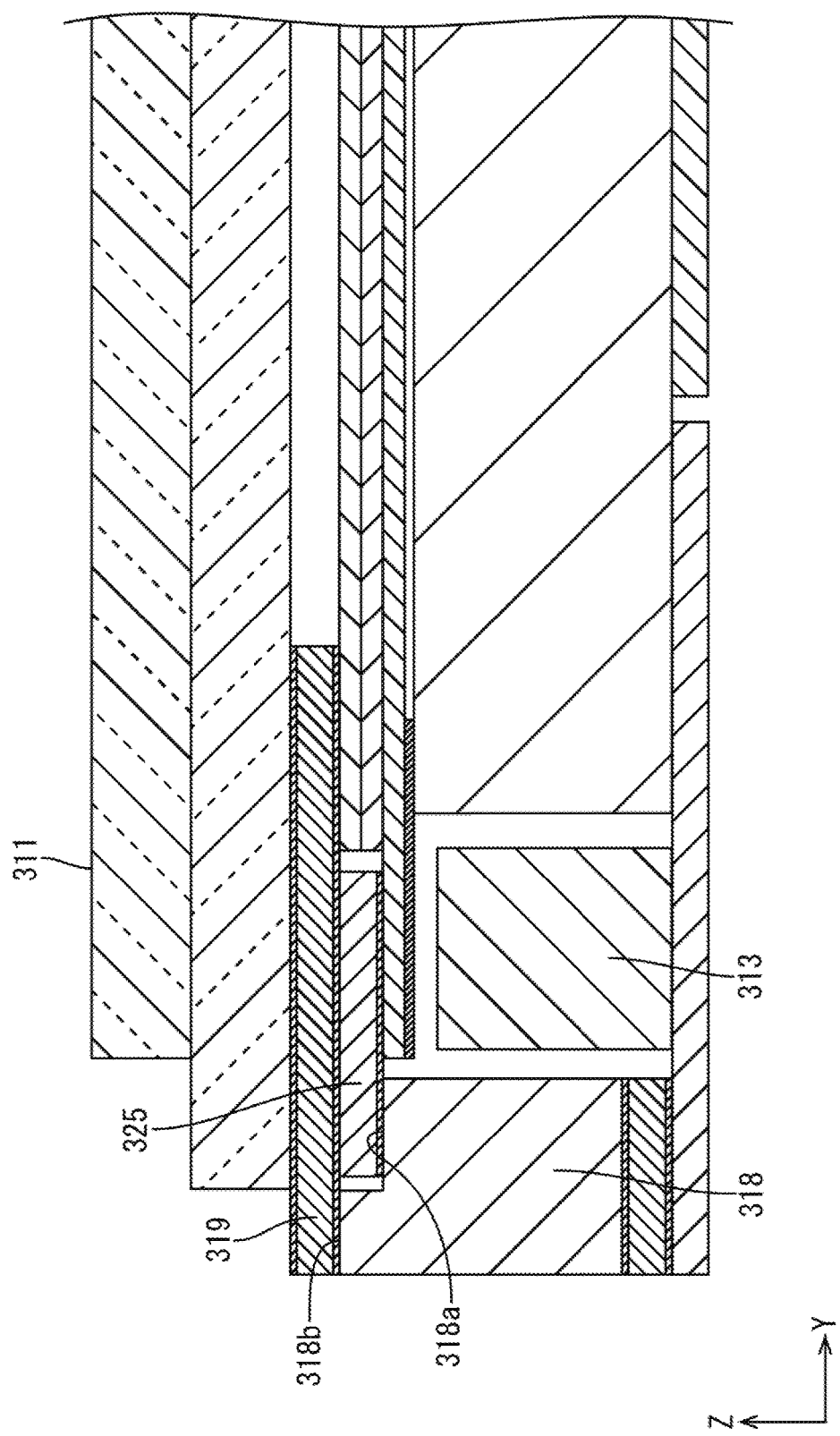
FIG. 10 is a side cross-sectional view of a liquid crystal display device according to a fourth embodiment of the present invention.

As shown in FIG. 10, the frame 318 according to the present embodiment has a cross-sectional shape at the short side portion on an LED 313 side formed to a staircase pattern of two steps, and includes a relatively low first surface 318a and a relatively high second surface 318b. The second frame fixing member 325 is fixed to the first surface 318a, and the panel fixing member 319 is fixed to the second surface 318b. Accompanying therewith, the second frame fixing member 325 has a shorter dimension in the Y axis direction and a smaller fixing area with respect to the frame 318 than that described in the third embodiment. The panel fixing member 319 thus includes a portion fixed to the second surface 318b of the frame 318, a portion fixed to the second frame fixing member 325, and a portion fixed to the second prism sheet 316c. Thus, a part of the panel fixing member 319 is directly fixed with respect to the frame 318, whereby a holding force of holding the frame 318 and a liquid crystal panel 311 becomes high.

Fifth Embodiment

A fifth embodiment of the present invention will be described according to FIG. 11. In the fifth embodiment, the second frame fixing member is omitted from the third embodiment described above. Redundant description on the structure, the operation, and the effect similar to the third embodiment will be omitted.

Figure 11:
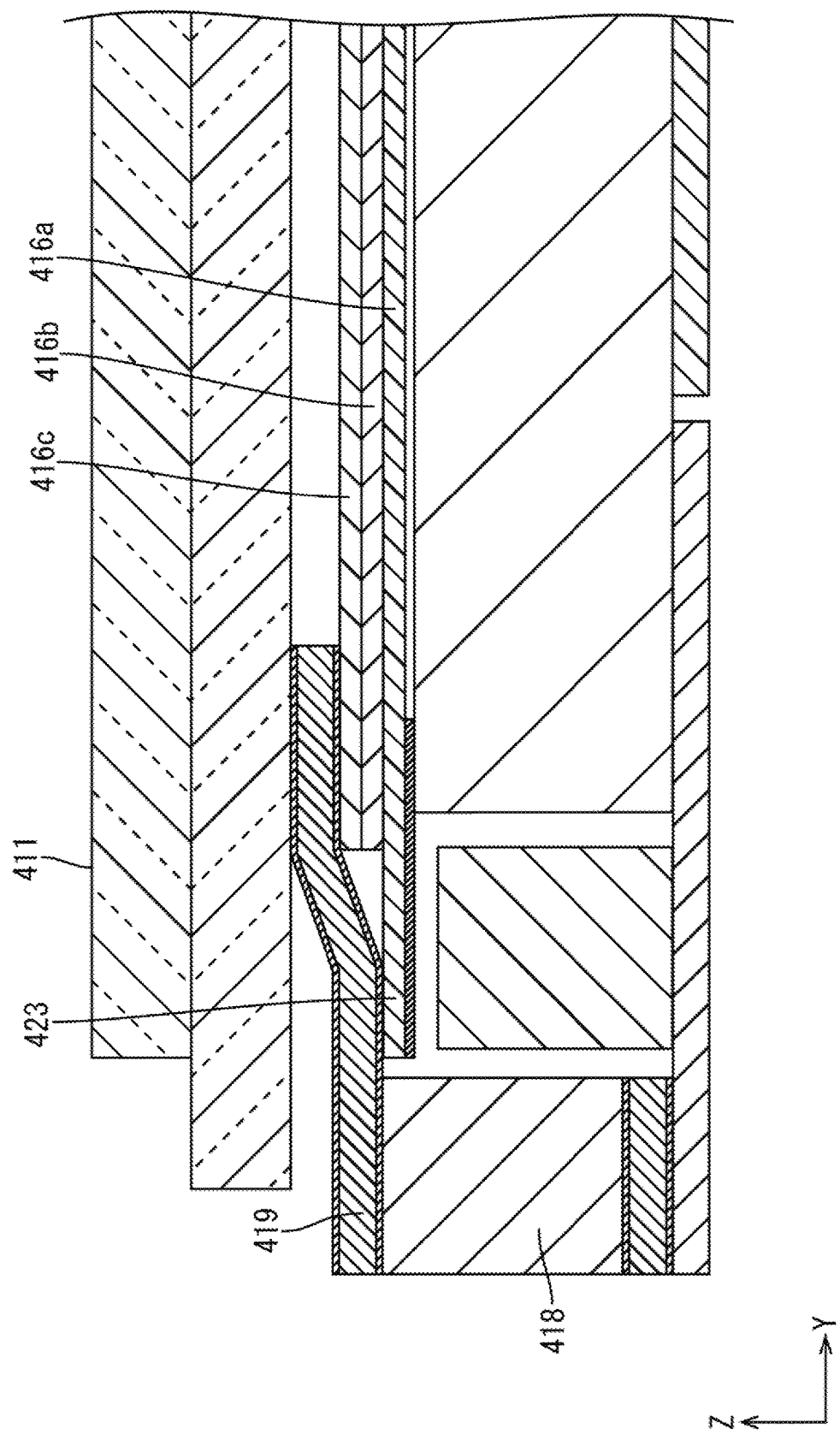
FIG. 11 is a side cross-sectional view of a liquid crystal display device according to a fifth embodiment of the present invention.

As shown in FIG. 11, a diffuser sheet 416a according to the present embodiment is fixed with respect to the frame 418 by a panel fixing member 419. That is, in the present embodiment, the panel fixing member 419 has both a function of fixing a frame 418, a first prism sheet 416*b*, and a second prism, sheet 416*c* to a liquid crystal panel 411, and a function of fixing the diffuser sheet 416*a* to the frame 418. Specifically, the panel fixing member 419 includes a portion fixed, to the frame 418, a portion fixed to an extended portion 423 of the diffuser sheet 416*a*, and a portion fixed to the second prism sheet 416*c*, where the portion fixed to the second prism sheet 416*c* is also fixed to the liquid crystal panel 411. The panel fixing member 419 has a portion between the portion fixed to the extended portion 423 of the diffuser sheet 416*a* and the portion fixed to the second prism sheet 416*c* bent. According to such configuration, the shape of the frame 418 is simplified, and the fixing area of the panel fixing member 419 with respect to the frame 418 is increased thus facilitating the attaching task, compared to the fourth embodiment described above.

Sixth Embodiment

A sixth embodiment of the present invention will be described according to FIGS. 12 to 14. In the sixth embodiment, the structure of a diffuser sheet 516*a* and a frame 518 is changed from the fifth embodiment described above. Redundant description on the structure, the operation, and the effect similar to the fifth embodiment will be omitted.

Figure 12:
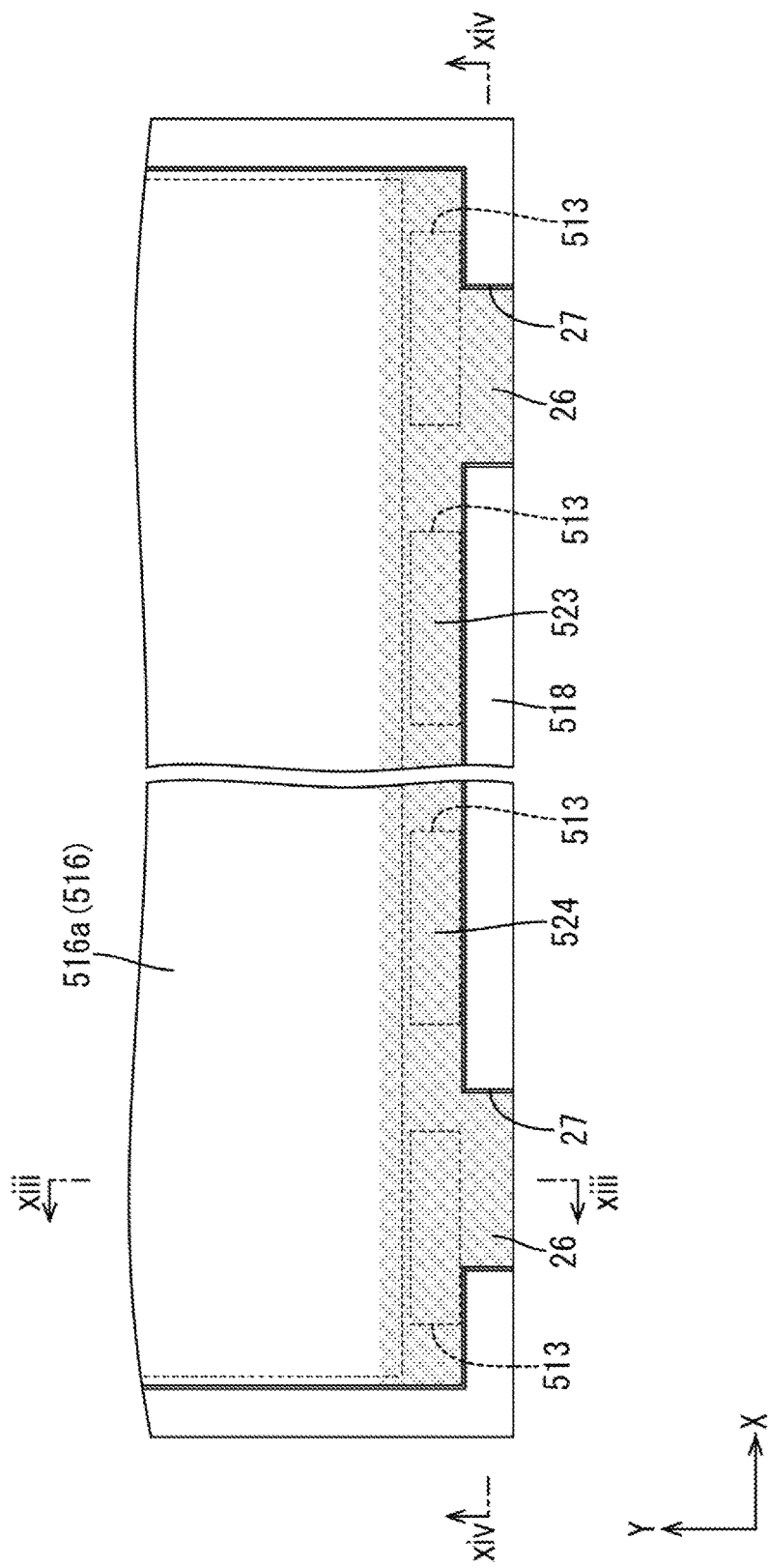
FIG. 12 is an enlarged plan view of a vicinity of an LED in a backlight device according to a sixth embodiment of the present invention.
Figure 13:
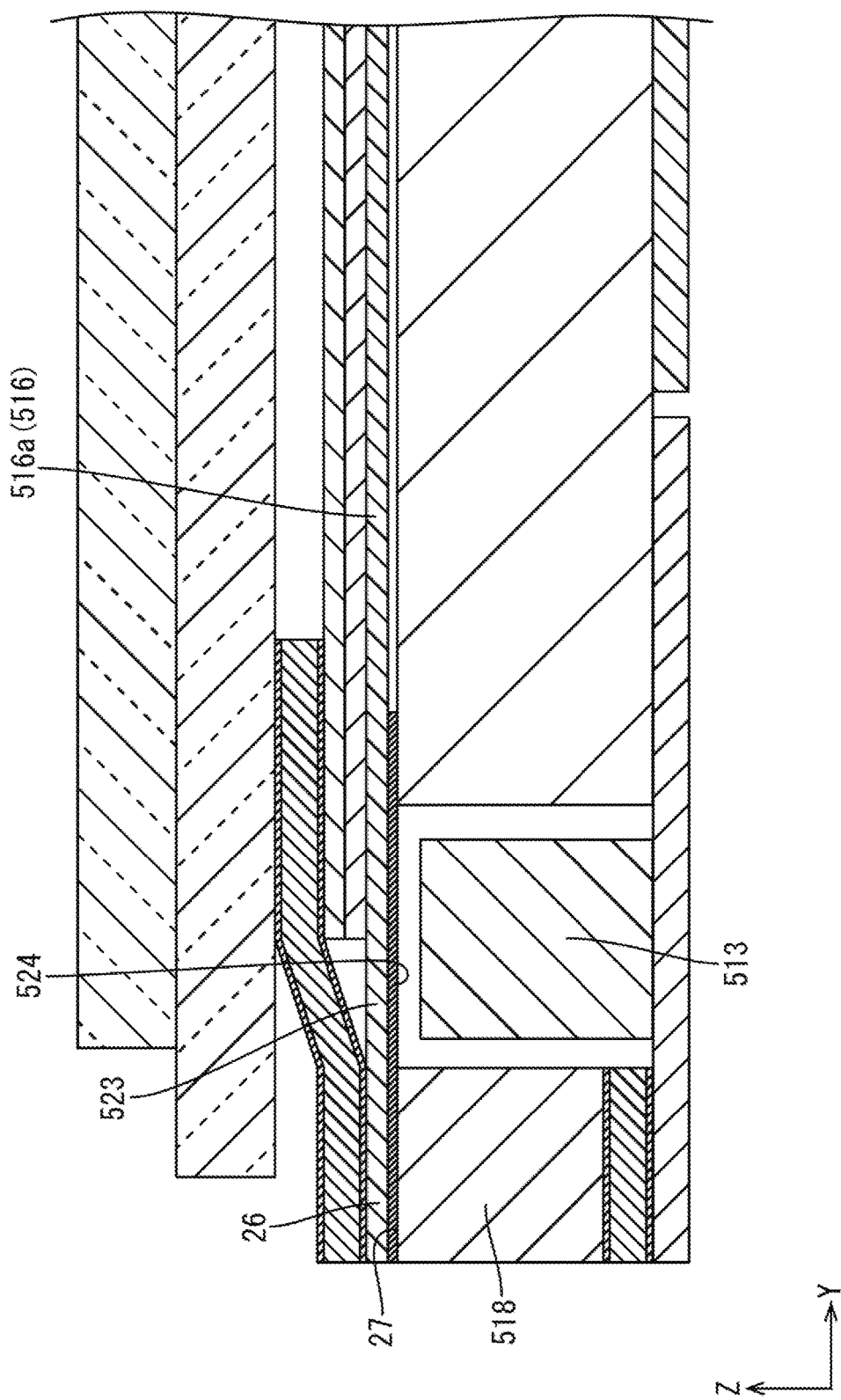
FIG. 13 is a cross-sectional view taken along line xiii-xiii of FIG. 12.

As shown in FIGS. 12 and 13, the diffuser sheet 516*a* according to the present embodiment includes a convex portion 26 projecting out further toward the outer side along the Y axis direction from an extended end of the extended portion 523. The convex portion 26 has a projecting piece shape projecting out from a part of the extended end of the extended portion 523, and is arranged in pairs in the vicinity of both end positions in the length direction (X axis direction) of the extended end of the extended portion 523. A low light-transmissive member 524 arranged on a light entering-side edge section overlapping section 522 and the extended portion 523 is formed in an extending manner at the convex portion 26. The low light-transmissive member 524 is arranged over the entire region of the convex portion 26.

Figure 14:
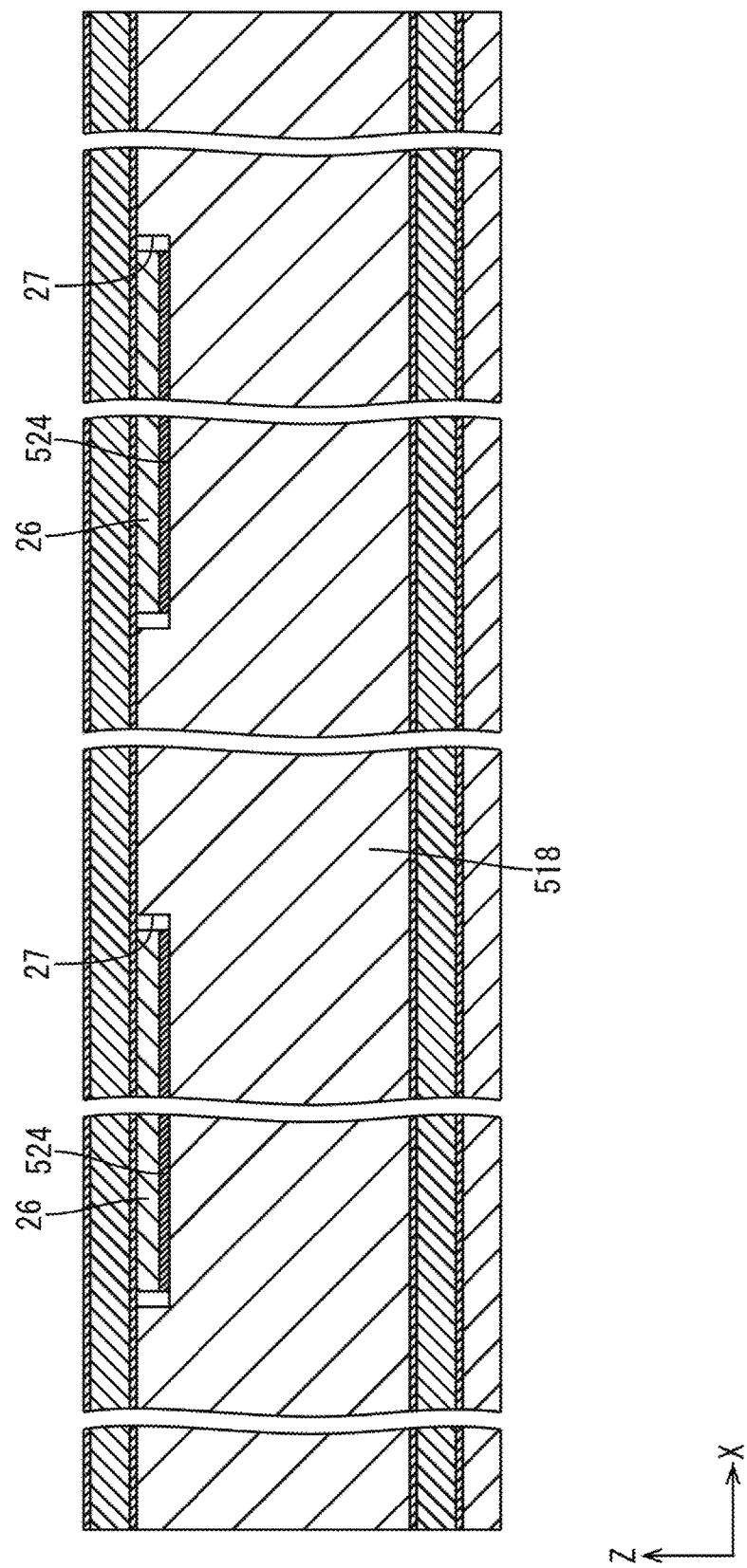
FIG. 14 is a cross-sectional view taken along line xiv-xiv of FIG. 12.

On the other hand, as shown in FIGS. 12 and 14, the frame 518 is provided with a concave portion 27 to which the convex portion 26 is to be inserted. The concave portion 27 is formed by partially recessing the short side portion on an LED 513 side in the frame 518, and is arranged in pairs in the vicinity of both end positions in the length direction (X axis direction) of the short side portion. The pair of concave portions 27 are arranged to overlap the pair of convex portions 26 when seen in a plan view. Both side edges of the convex portion 26 can be brought into contact with a pair of inner side surfaces along the Z axis direction and the Y axis direction on the inner peripheral surface of the concave portion 27, so that the diffuser sheet 516*a* is positioned in the X axis direction with respect to the frame 518. Thus, the function of the low light-transmissive member 524 arranged on the diffuser sheet 516*a* can be more appropriately exerted.

According to the present embodiment described above, the frame 518 is provided with the concave portion 27, and the optical sheet 516 is provided with the convex portion 26 to be inserted to the concave portion 27. The optical sheet 516 can be positioned with respect to the frame 518 by inserting the convex portion 26 provided on the optical sheet 516 to the concave portion 27 provided on the frame 518.

Seventh Embodiment

A seventh embodiment of the present invention will be described according to FIG. 15 or 16. In the seventh embodiment, the arrangement of a convex portion 626 and a concave portion 627 is changed from the sixth embodiment described above. Redundant description on the structure, the operation, and the effect similar to the sixth embodiment will be omitted.

Figure 15:
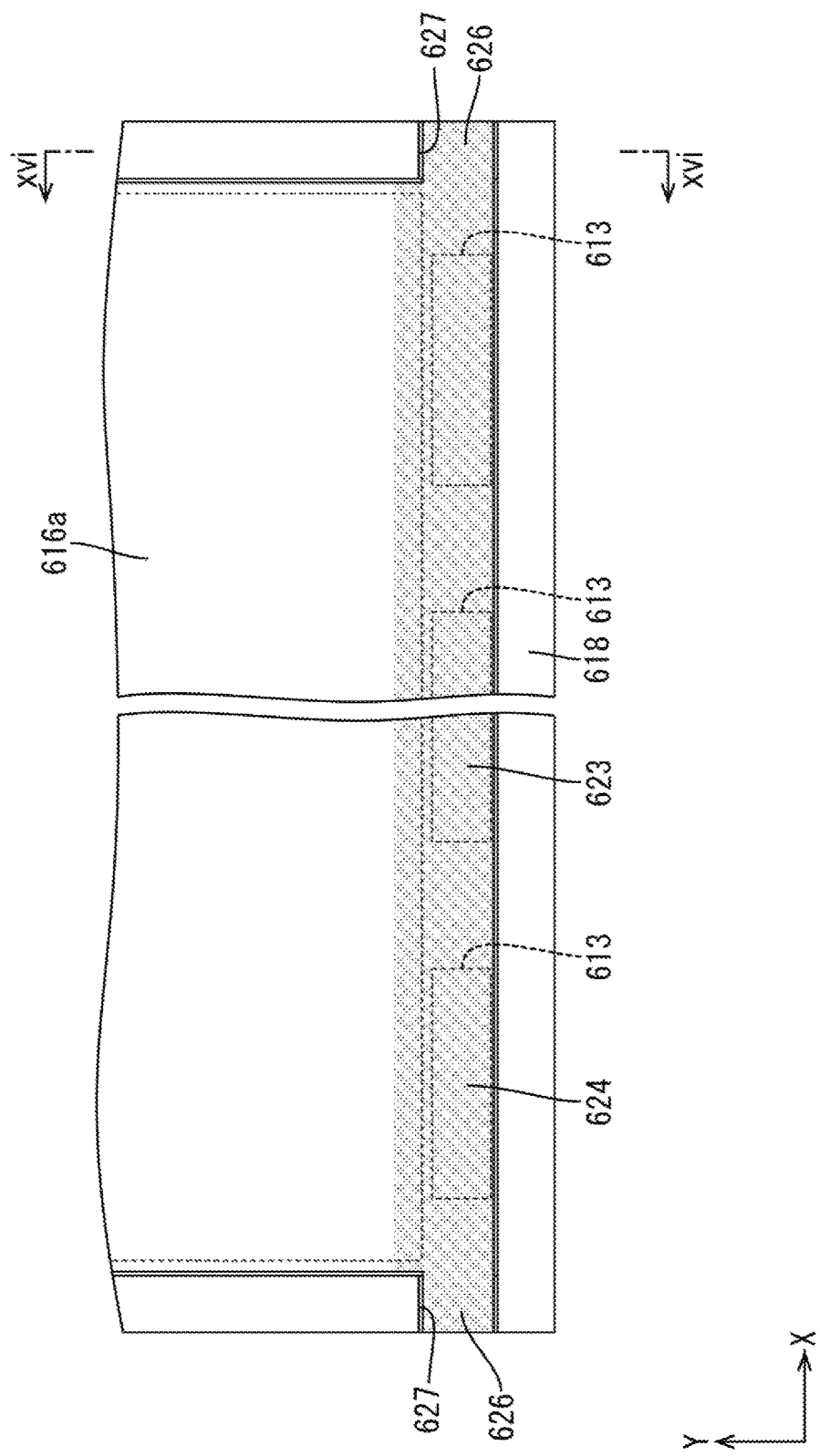
FIG. 15 is an enlarged plan view of a vicinity of an LED in a backlight device according to a seventh embodiment of the present invention.
Figure 16:
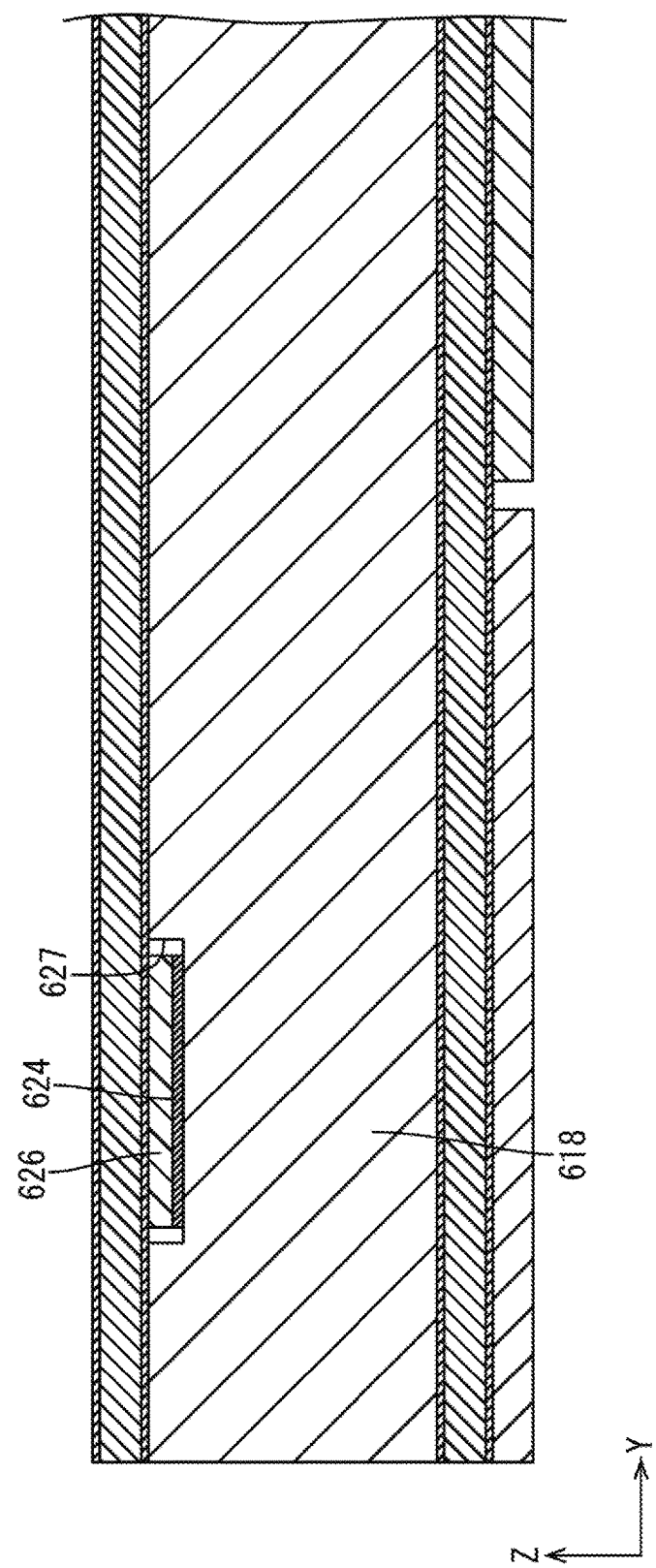
FIG. 16 is a cross-sectional view taken along line xvi-xvi of FIG. 15.

As shown in FIGS. 15 and 16, a pair of convex portions 626 according to the present embodiment are provided so as to project out toward the outer side along the X axis direction from both side ends in the X axis direction of an extended portion 623 of a diffuser sheet 616*a*. The convex portion 626 has a low light-transmissive member 624 arranged over the entire region thereof. The concave portion 627 is formed by partially recessing a pair of long side portions, respectively, in the frame 618, and is respectively formed in the vicinity of the end on an LED 613 side in the Y axis direction of each long side portion. The pair of concave portions 627 are arranged to overlap the pair of convex portions 626 when seen in a plan view. Both side edges of the convex portion 626 can be brought into contact with a pair of inner side surfaces along the Z axis direction and the X axis direction on the inner peripheral surface of the concave portion 627, so that the diffuser sheet 616*a* is positioned in the Y axis direction with respect to the frame 618. Thus, the function of the low light-transmissive member 624 arranged on the diffuser sheet 616*a* can be more appropriately exerted.

Eighth Embodiment

An eighth embodiment of the present invention will be described according to FIG. 17 or 18. In the eighth embodiment, a light guide plate fixing member 28 for fixing an optical sheet 716 to a light guide plate 715 is additionally shown to that described in the second embodiment. Redundant description on the structure, the operation, and the effect similar to the second embodiment will be omitted.

Figure 18:
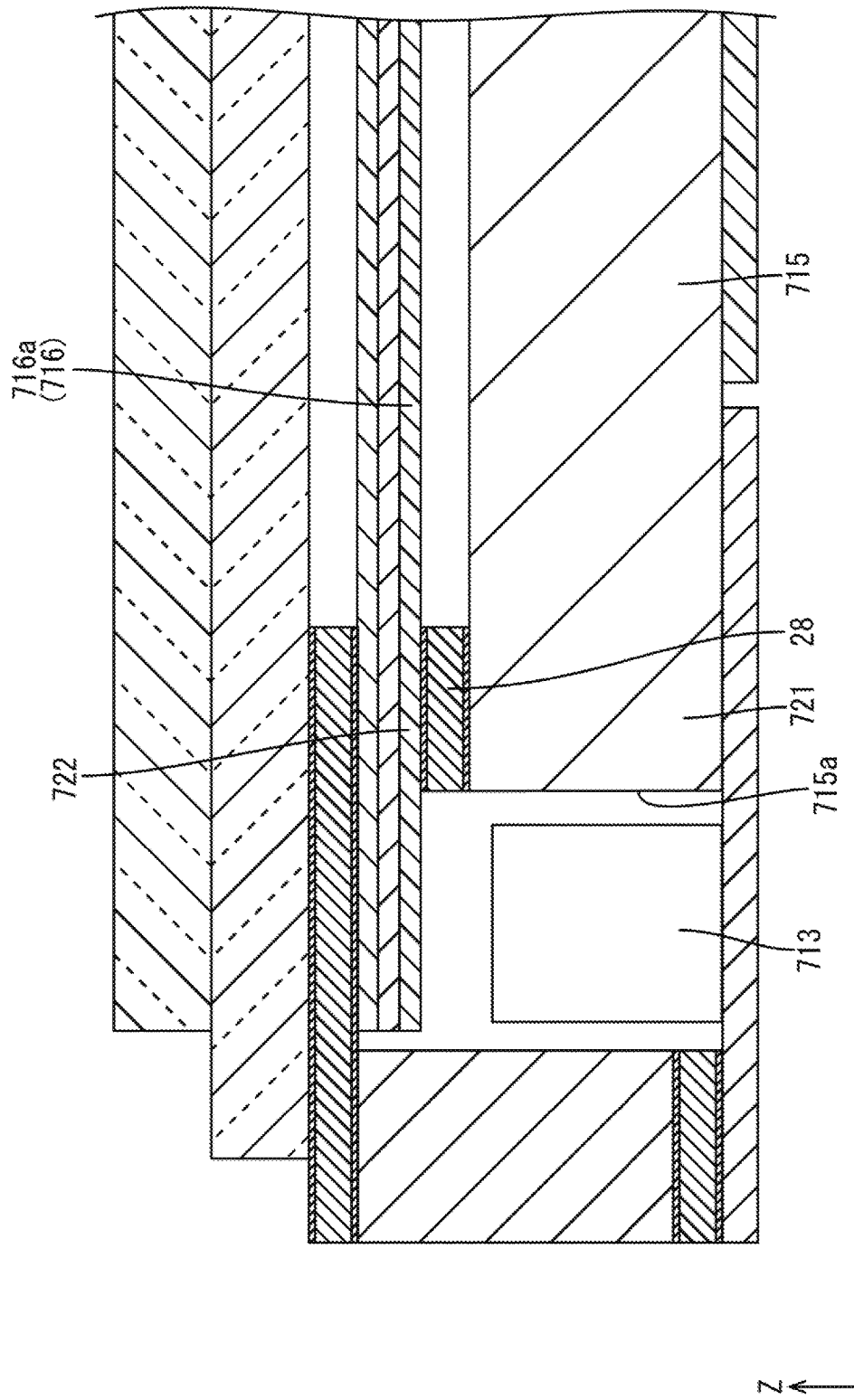
FIG. 18 is a cross-sectional view taken along line xviii-xviii of FIG. 17.

As shown in FIG. 18, a diffuser sheet 716*a* arranged with a low light-transmissive member 724 of the optical sheets 716 is fixed to the light guide plate 715 according to the present embodiment by the light guide plate fixing member 28. The light guide plate fixing member 28 is a double-sided securely attaching type in which an adhesive material is applied on both front and back surfaces of a base member. The light guide plate fixing member 28 is arranged to be interposed between a light entering-side edge section overlapping section 722 of the diffuser sheet 716*a* and a light entering-side edge section 721 of the light guide plate 715 in the Z axis direction, where the adhesive material on the front side of the base member is securely attached to the light entering-side edge section overlapping section 722 and the adhesive material on the back side of the base member is securely attached to the light entering-side edge section 721. Thus, the positioning of the low light-transmissive member 724 of the diffuser sheet 716*a* with respect to the light guide plate 715 is achieved by fixing the light entering-side edge section overlapping section 722 of the diffuser sheet 716*a* with respect to the light entering-side edge section 721 of the light guide plate 715 by the light guide plate fixing member 28. Thus, the function of the low light-transmissive member 724 can be appropriately exerted, and the occurrence of uneven brightness can be suitably suppressed.

Figure 17:
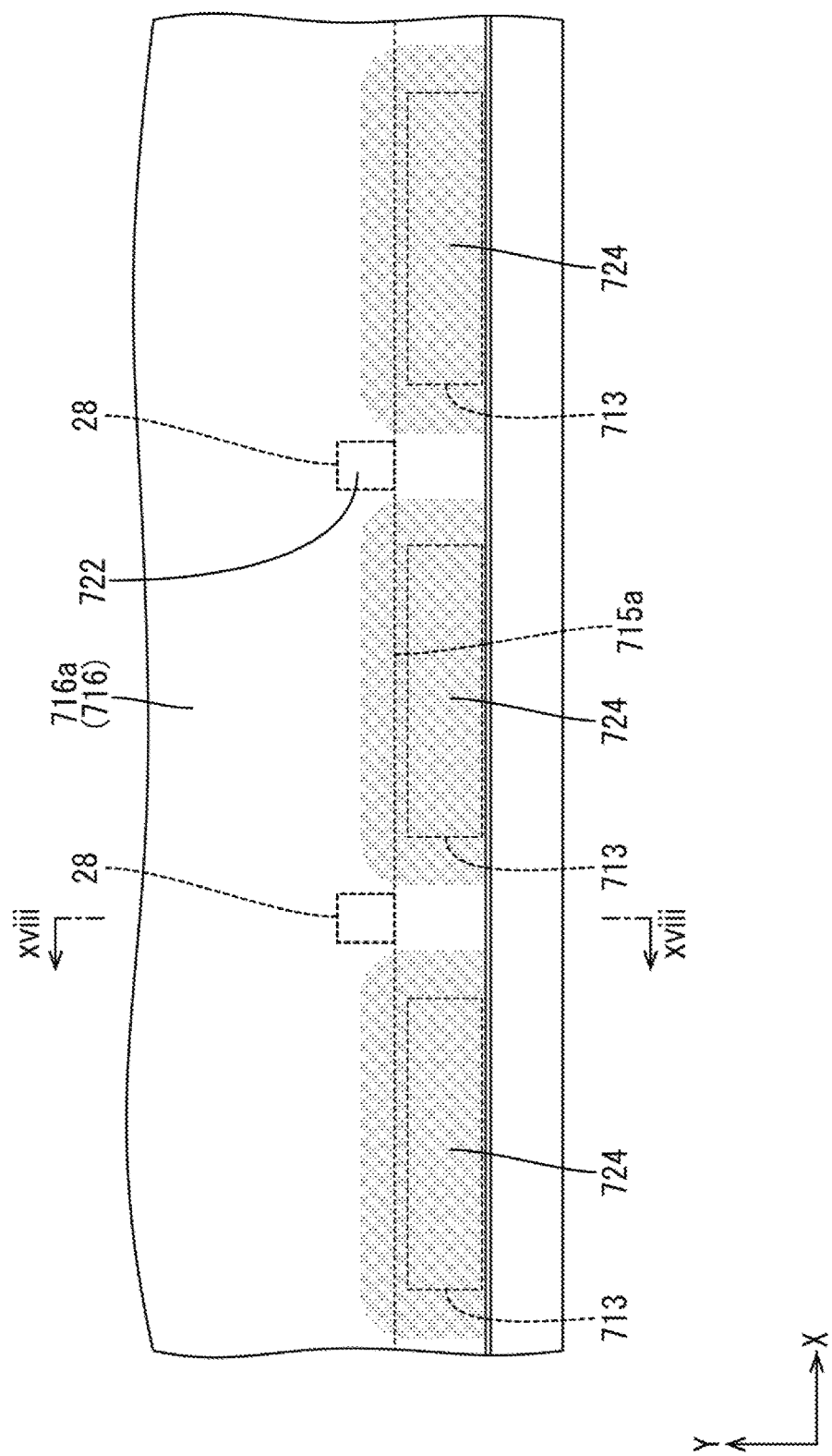
FIG. 17 is an enlarged plan view of a vicinity of an LED in a backlight device according to an eighth embodiment of the present invention.

As shown in FIG. 17, the light guide plate fixing member 28 is arranged so as to be lined in plural at a position (low light-transmissive member non-arranging position) not overlapping each low light-transmissive member 724 and the LED 713 in the X axis direction. That is, light guide plate fixing members 28 are arranged so as to be intermittently lined in the X axis direction, similar to the arrangement of the low light-transmissive member 724 on the diffuser sheet 716a. The dimension in the X axis direction in each light guide plate fixing member 28 is an extent substantially the same as or slightly smaller than an interval between the low light-transmissive members 724 adjacent in the X axis direction, so that each light guide plate fixing member 28 is arranged not to overlap each low light-transmissive member 724. Since each light guide plate fixing member 28 is directly brought into contact with the light entering-side edge section 721 of the light guide plate 715, the light in the light entering-side edge section 721 may be guided toward each light guide plate fixing member 28 side, but even if the light in the light entering-side edge section 721 is guided toward each light guide plate fixing member 28 side, the light is less likely to reach the low light-transmissive member 724 since each light guide plate fixing member 28 is arranged so as not to overlap each low light-transmissive member 724 in the X axis direction, as described above. Thus, the light is avoided from being excessively absorbed and the like by the low light-transmissive member 724, and the lowering in brightness is more suitably suppressed. The light guide plate fixing member 28 has an arrangement such that the light guidance to the low light-transmissive member 724 is less likely to occur, and thus a configuration including a substantially transparent base member excelling in translucency and an adhesive material is suitable in enhancing usage efficiency of the light.

According to the present embodiment described above, the light guide plate fixing member 28 for fixing the light entering-side edge section overlapping section 722 with respect to at least the light entering-side edge section 721, the light guide plate fixing members 28 being arranged so as to be lined at positions not overlapping the low light-transmissive members 724 in the length direction. Thus, the positioning of the optical sheet 716 with respect to the light guide plate 715 is achieved by fixing the light entering-side edge section overlapping section 722 of the optical sheet 716 with respect to the light entering-side edge section 721 of the light guide plate 715 by the light guide plate fixing members 28. Thus, the function of the low light-transmissive member 724 arranged in the optical sheet 716 can be appropriately exerted, and the occurrence of uneven brightness can be suitably suppressed. The light guide plate fixing members 28 are arranged so as to be lined at positions not overlapping the low light-transmissive members 724 in the length direction of the light entering end surface 715a, and thus even if the light in the light entering-side edge section 721 is guided toward each light guide plate fixing member 28 side when the light-guide plate fixing members 28 are directly brought into contact with the light entering-side edge section 721, the light is less likely to reach the low light-transmissive member 724. Thus, the light is avoided from being excessively absorbed and the like by the low light-transmissive member 724, and the lowering in brightness is more suitably suppressed.

Ninth Embodiment

A ninth embodiment of the present invention will be described according to FIGS. 19 to 21. The ninth embodiment includes a light guide plate 815 and light guide plate fixing members 828 having configurations different from those of the eighth embodiment described above. Redundant description on the structure, the operation, and the effect similar to the eighth embodiment will be omitted.

Figure 19:
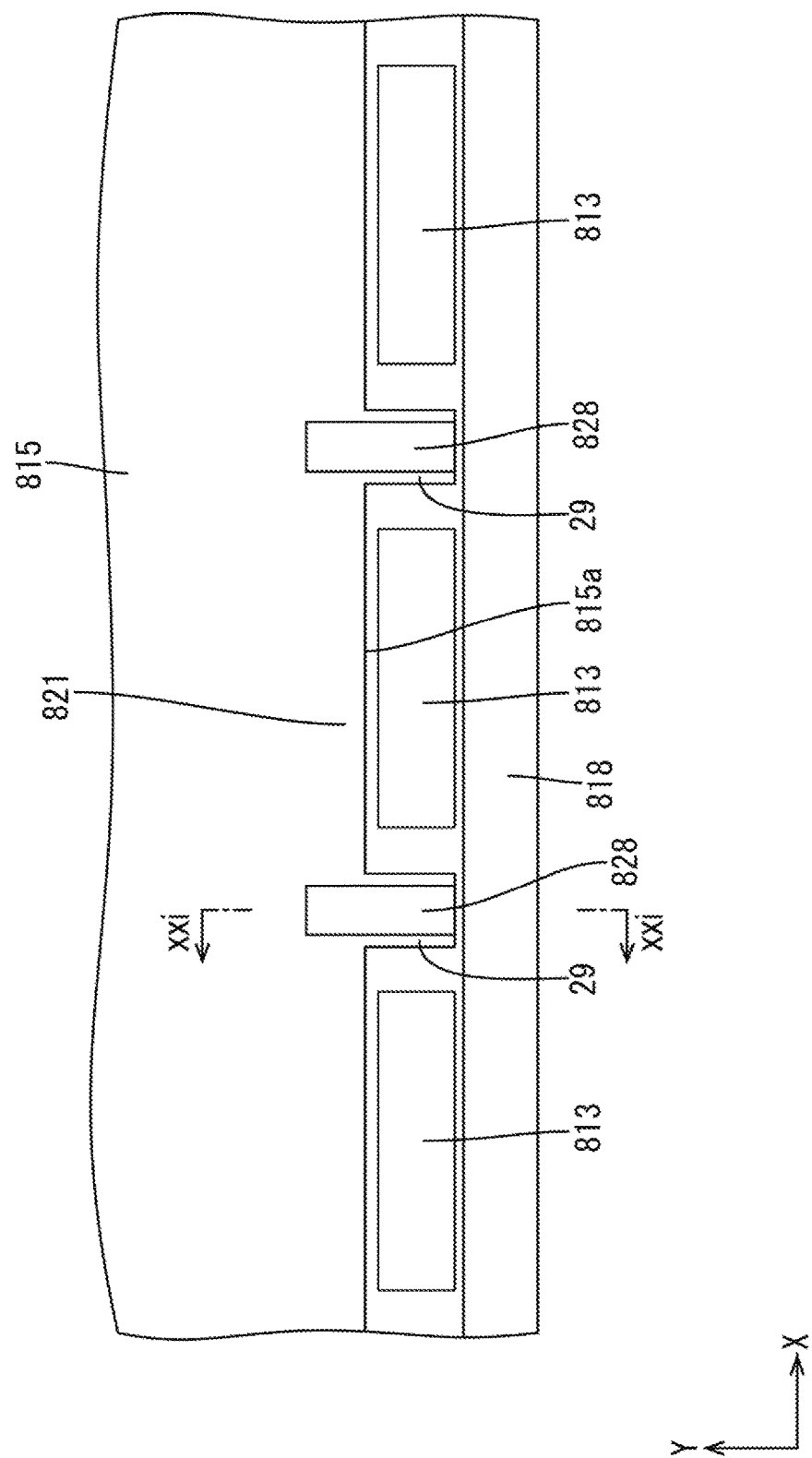
FIG. 19 is an enlarged plan view of a vicinity of an LED in a backlight device excluding an optical member according to a ninth embodiment of the present invention.
Figure 21:
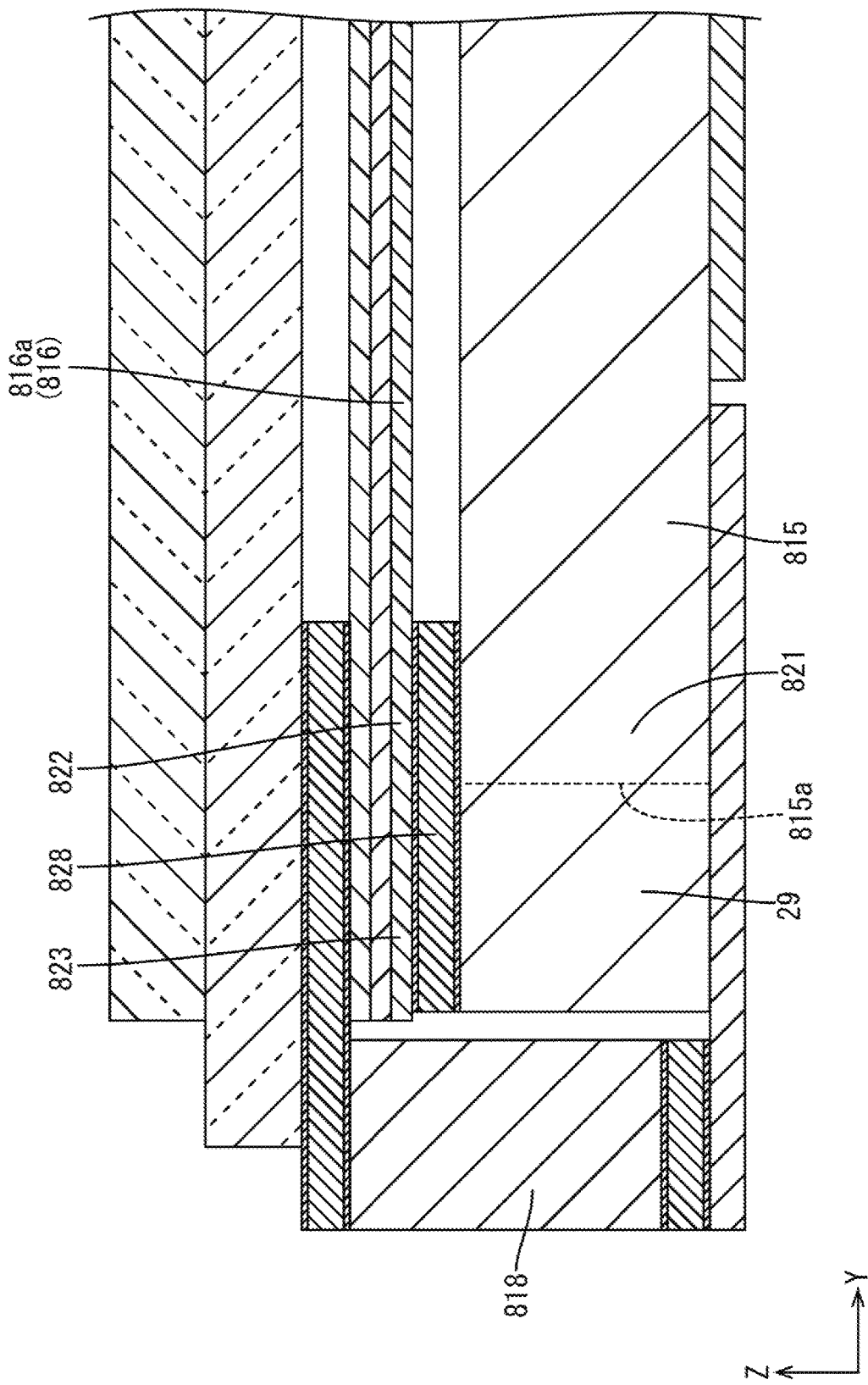
FIG. 21 is a cross-sectional view taken along line xxi-xxi of FIGS. 19 and 20.

As shown in FIGS. 19 and 21, the light guide plate 815 according to the present embodiment is provided with a projection 29 projecting out toward an LED 813 and a frame 818 side in the Y axis direction from, a light entering end surface 815a at a light entering-side edge section 821. Projections 29 are arranged so as to be intermittently lined at positions not overlapping the LED 813 in the X axis direction, and sandwich each LED 813 from both sides in the X axis direction. That is, the LEDs 813 adjacent to each other in the X axis direction are partitioned by the projection 29. The LEDs 813 and the projections 29 are alternately and repeatedly arranged in line along the X axis direction. Each projection 29 is arranged to overlap the corresponding light guide plate fixing member 828 in the X axis direction, that is, to overlap the corresponding light guide plate fixing member 828 when viewed in plan. Furthermore, a projecting distal end surface from the light entering end surface 815a can be brought into contact with an inner side surface in the short side portion of the frame 818, so that when the light guide plate 815 is thermally expanded and the projection 29 makes contact with the snort side portion of the frame 818, the light guide plate 815 can be regulated from stretching any further toward the LED 813 side, and the interference of the light guide plate 815 with respect to the LED 813 can be prevented.

Figure 20:
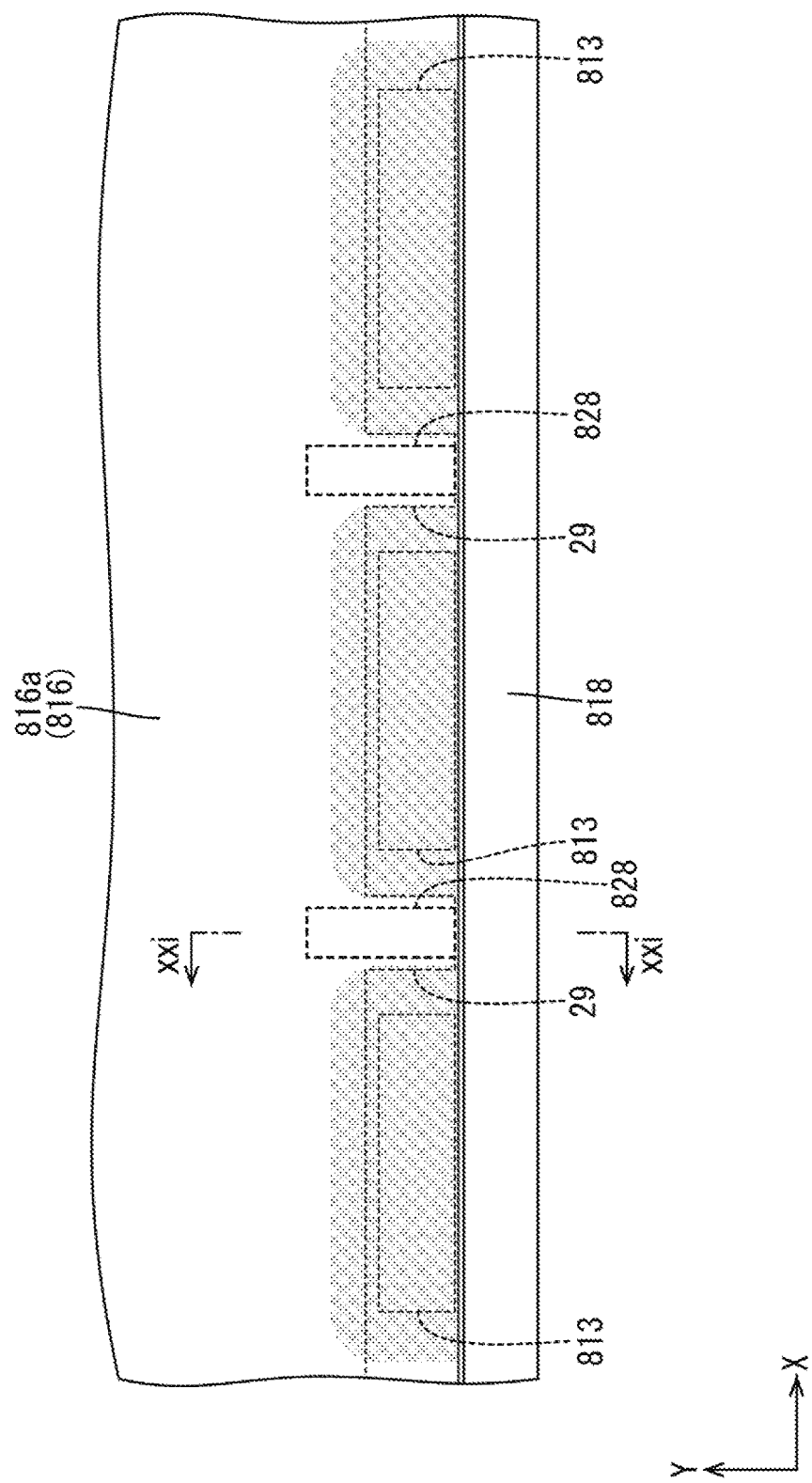
FIG. 20 is an enlarged plan view of the vicinity of the LED in the backlight device.

As shown in FIGS. 19 to 21, the light guide plate fixing member 828 is formed to extend more than that described in the eighth embodiment to also overlap the projection 29 and the extended portion 823 in addition to the light entering-side edge section 821 of the light guide plate 815 and the light entering-side edge section overlapping section 822 of a diffuser sheet 816a. Therefore, the light guide plate fixing member 828 is arranged to be interposed between the light entering-side edge section overlapping section 822 and the extended portion 823 of the diffuser sheet 816a, and the light entering-side edge section 821 and the projection 29 of the light guide plate 815 in the Z axis direction, where the adhesive material on the front side of the base member is securely attached to the light entering-side edge section overlapping section 822 and the extended portion 823, and the adhesive material on the back side of the base member is securely attached to the light entering-side edge section 821 and the projection 29. According to such configuration, the fixing area of the diffuser sheet 816a with respect to the light guide plate 815 by the light guide plate fixing member 828 is increased compared to the eighth embodiment, and hence the fixing force becomes stronger, and the diffuser sheet 816a can be more suitably positioned with respect to the light guide plate 815.

According to the present embodiment described above, the optical sheet 816 includes the extended portion 823 extending from the light entering-side edge section overlapping section 822 toward the LED 813 side and a section that overlaps the LED 813, the light guide plate 815 has the projection 29 projecting out from the light entering end surface 815a toward the LED 813 side arranged so as to be lined in plural at positions overlapping the light guide plate fixing members 828 in the length direction, and the light guide plate fixing members 828 fix the light entering-side edge section overlapping section 822 and the extended portion 823 with respect to the light entering-side edge section 821 and the projection 29. Accordingly, the extended portion 823 is fixed with respect to the projection 29 in addition to the light entering-side edge section overlapping section 822 being fixed with respect to the light entering-side edge section 821 by the light guide plate fixing member 828, and thus a stronger fixing force is obtained. Thus, the optical sheet 816 can be more suitably positioned with respect to the light guide plate 815.

Tenth Embodiment

A tenth embodiment of the present invention will be described according to FIG. 22 or 23. In the tenth embodiment, a forming range of a low light-transmissive member 924 is changed from the first embodiment described above. Redundant description on the structure, the operation, and the effect similar to the first embodiment will be omitted.

Figure 22:
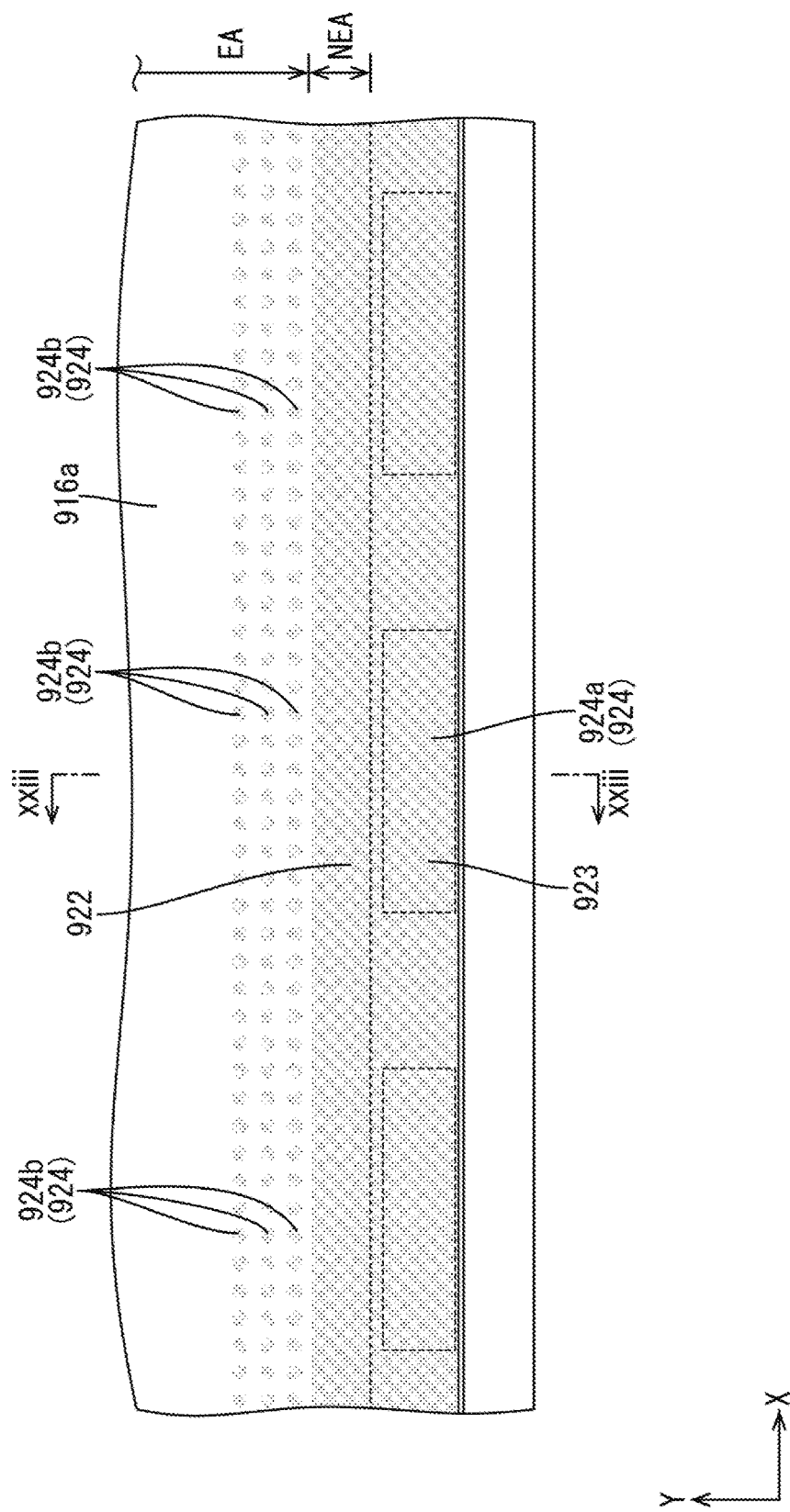
FIG. 22 is an enlarged plan view of a vicinity of an LED in a backlight device according to a tenth embodiment of the present invention.
Figure 23:
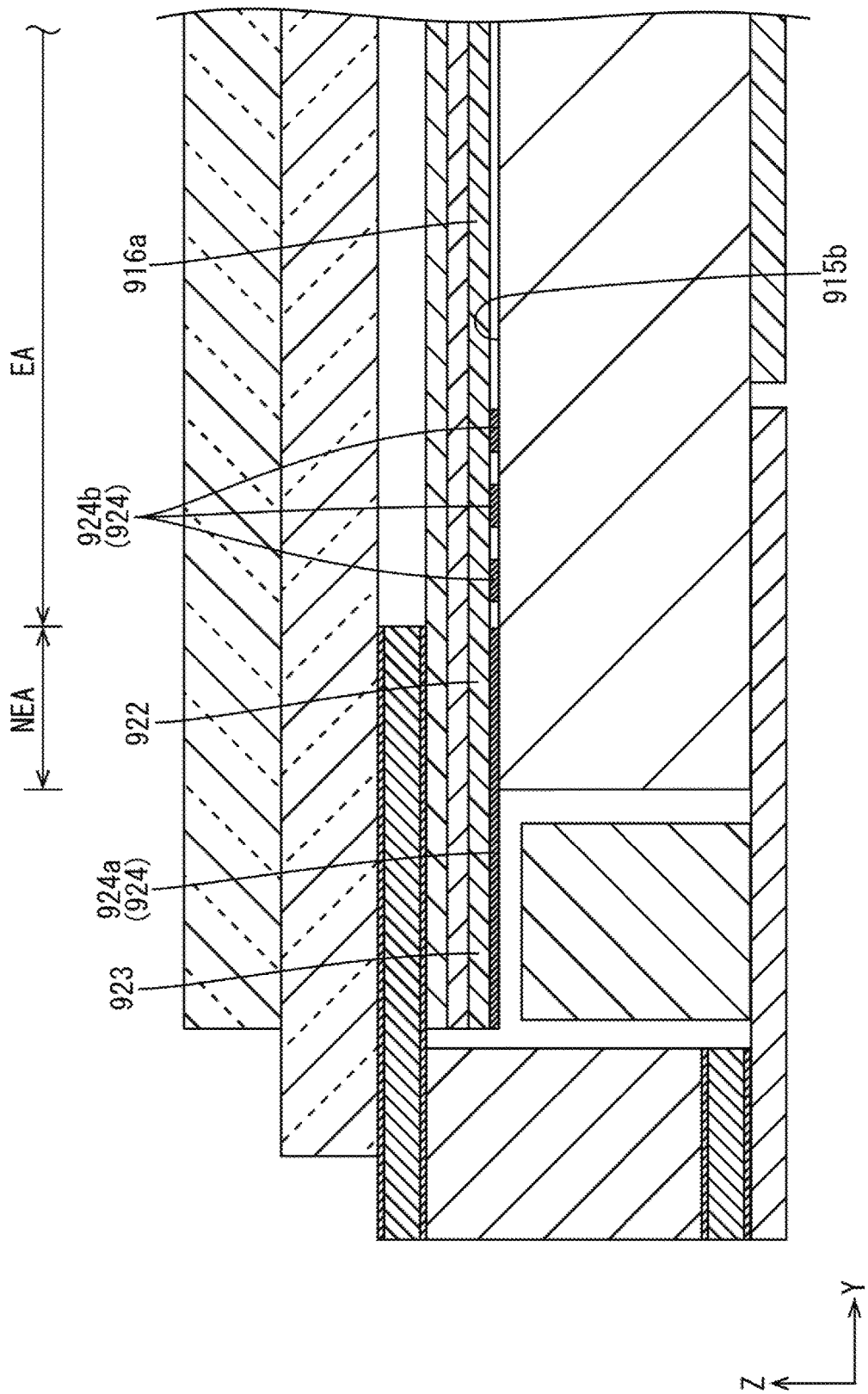
FIG. 23 is a cross-sectional view taken along line xxiii-xxiii of FIG. 22.

As shown in FIGS. 22 and 23, the low light-transmissive member 924 according to the present embodiment is formed across an area that overlaps the effective light exiting area EA when seen in a plan view, in addition to the non-effective light exiting area NEA. That is, the low light-transmissive member 924 is two-dimensionally arranged across the non-effective light exiting area NEA and the effective light exiting area EA. In the low light-transmissive member 924, the light transmissivity is assumed to differ between a non-effective light exiting area overlapping section 924a that overlaps the non-effective light exiting area NEA and an effective light exiting area overlapping section 924b that overlaps the effective light exiting area EA, where the latter is assumed to have a higher light transmissivity than the former. According to such configuration, the effective light exiting area overlapping section 924b of the low light-transmissive member 924 is arranged to overlap the effective light exiting area EA, and thus the frame can be further narrowed compared to when the entire region of the low light-transmissive member 24 is arranged to overlap the non-effective light exiting area NEA as in the first embodiment described above. Furthermore, as the effective light exiting area overlapping section 924b of the low light-transmissive member 924 has a higher light transmissivity than the non-effective light exiting area overlapping section 924a, the effective light exiting area overlapping section 924b is less likely to be visually recognized from the user even if it is present in the effective light exiting area EA. Furthermore, the uneven brightness is less likely to occur.

Specifically, the non-effective light exiting area overlapping section 924a includes a band shaped light blocking layer extending along the X axis direction in a light entering-side edge section overlapping section 922 and an extended portion 923 of a diffuser sheet 916a. On the other hand, the effective light exiting area overlapping section 924b includes a dot shaped light blocking layer arranged so as to be intermittently lined in the X axis direction and the Y axis direction, respectively, at the light entering-side edge section overlapping section 922 of the diffuser sheet 916a. That is, the band shaped light blocking layer-configuring the non-effective light exiting area overlapping section 924a is arranged over the entire region at the section that overlaps the non-effective light exiting area NEA of the light entering-side edge section overlapping section 922 of the diffuser sheet 916a, but the dot shaped light blocking layer configuring the effective light exiting area overlapping section 924b is partially arranged at the section that overlaps the effective light exiting area EA, and hence a range where the light blocking layer is not formed exists. The light transmissivity in the effective light exiting area overlapping section 924b is thus higher than the light transmissivity in the non-effective light exiting area overlapping section 924a.

According to the present embodiment described above, when a light exiting plate surface 915b is sectionalized to the effective light exiting area EA from which the light is effectively exit and the non-effective light exiting area NEA surrounding the effective light exiting area EA, the low light-transmissive member 924 is two-dimensionally arranged across the non-effective light exiting area NEA and the effective light exiting area EA, where the section that overlaps the effective light exiting area EA is assumed to have a higher light transmissivity than the section that overlaps the non-effective light exiting area NEA. Therefore, a part of the low light-transmissive member 924 is arranged to overlap the effective light exiting area EA, whereby the frame can be further narrowed compared to when the entire region of the low light-transmissive member 924 is arranged to overlap the non-effective light exiting area NEA. Furthermore, as the section that overlaps the effective light exiting area EA of the low light-transmissive member 924 is assumed to have a higher light transmissivity than the section that overlaps the non-effective light exiting area NEA, the section that overlaps the non-effective light exiting area NEA in the low light-transmissive member 924 is less likely to be visually recognized, and the uneven brightness is less likely to occur.

Eleventh Embodiment

An eleventh embodiment of the present invention will be described according to FIG. 24. In the eleventh embodiment, the arrangement of a low light-transmissive member 1024 is changed from the first embodiment described above. Redundant description on the structure, the operation, and the effect similar to the first embodiment will be omitted.

Figure 24:
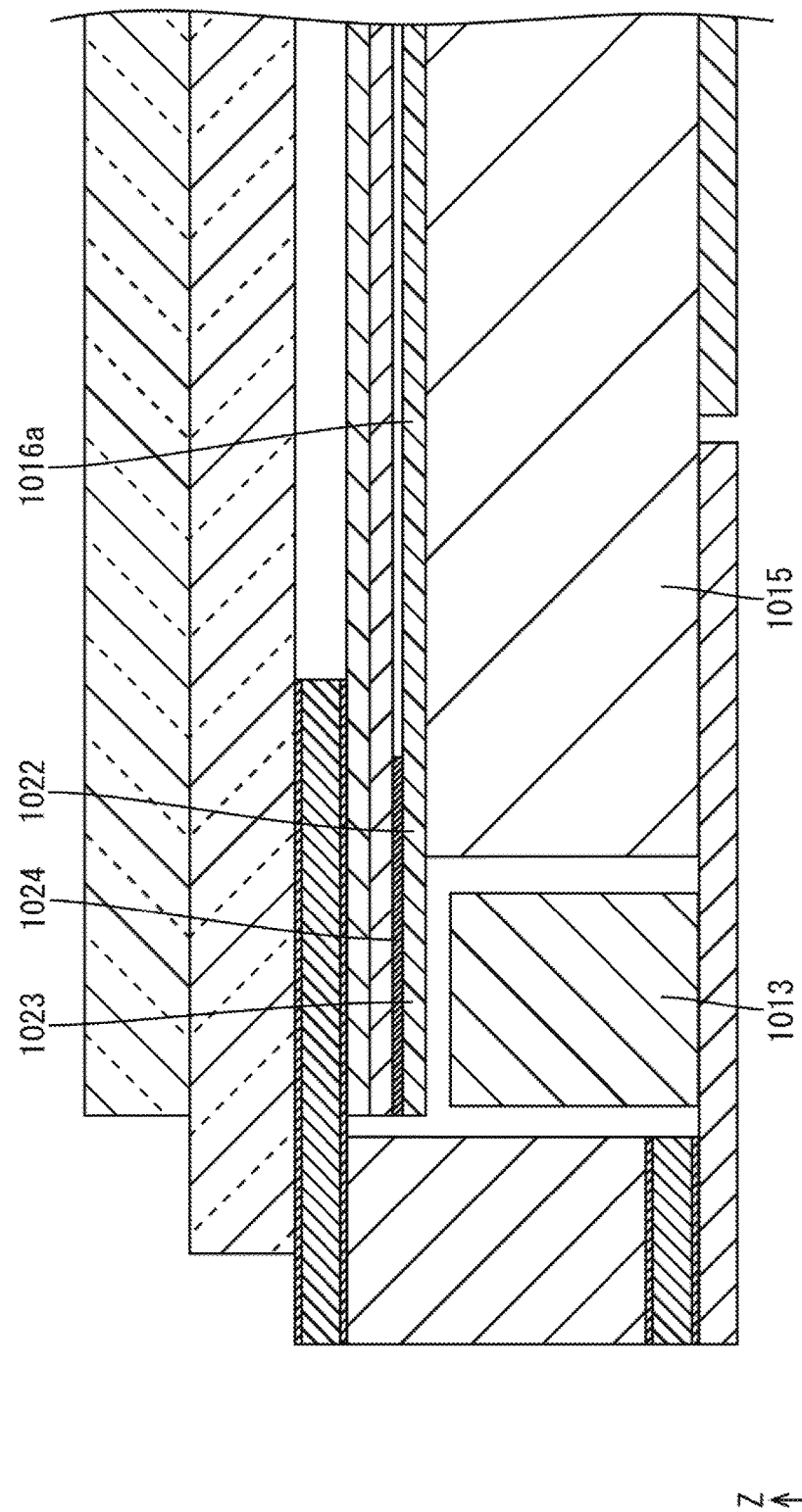
FIG. 24 is a side cross-sectional view of a liquid crystal display device according to an eleventh embodiment of the present invention.

As shown in FIG. 24, the low light-transmissive member 1024 according to the present embodiment is arranged on the plate surface on the front side of the front and back plate surfaces of a diffuser sheet 1016a, that is, the plate surface on an opposite side of a light guide plate 1015 side. Even with such configuration, the light emitted from an LED 1013 and advancing toward a light entering-side edge section overlapping section 1022 and an extended portion 1023 in the diffuser sheet 1016a once enters the light entering-side edge section overlapping section 1022 and an extended portion 1023, but is absorbed by the low light-transmissive member 1024 when reaching the plate surface on the front side, and thus becomes difficult to be propagated through the diffuser sheet 1016a and exit to the outside. The occurrence of uneven brightness thus can be suppressed.

Twelfth Embodiment

A twelfth embodiment of the present invention will be described according to FIG. 25. In the twelfth embodiment, a forming range of a low light-transmissive member 1124 is changed from, the eleventh embodiment described above. Redundant description on the structure, the operation, and the effect similar to the eleventh embodiment will be omitted.

Figure 25:
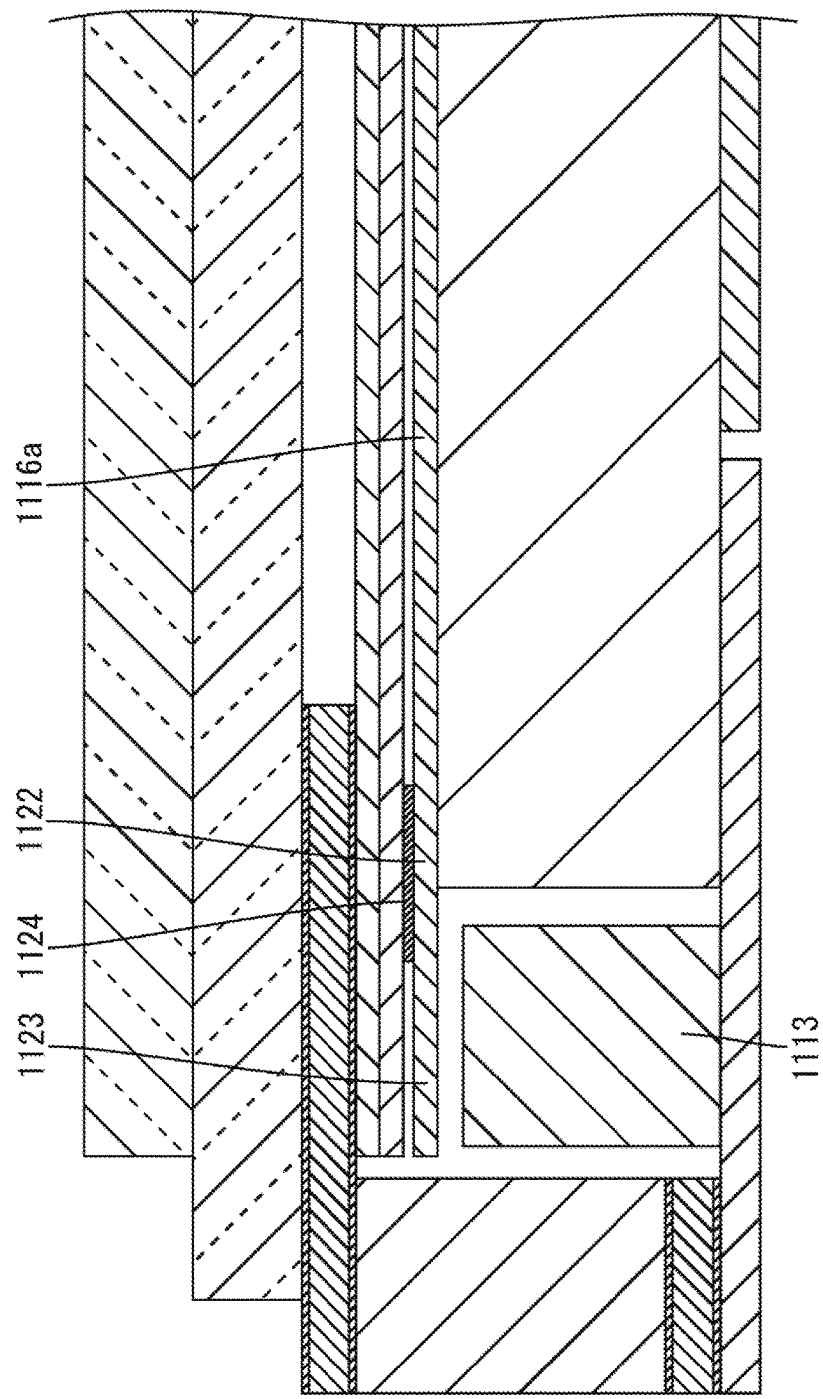
FIG. 25 is a side cross-sectional view of a liquid crystal display device according to a twelfth embodiment of the present invention.

As shown in FIG. 25, the low light-transmissive member 1124 according to the present embodiment is partially arranged on an extended portion 1123 of a diffuser sheet 1116a. Specifically, the low light-transmissive member 1124 is arranged at the portion on the light entering-side edge section overlapping section 1122 side of the extended portion 1123, but is not arranged at any farther portion on an extending distal end side. Even with such configuration, the light emitted from an LED 1113 and advancing toward the vicinity of the light entering-side edge section overlapping section 1122 of the diffuser sheet 1116a can be more efficiently absorbed by the low light-transmissive member 1124, and the occurrence; of the uneven brightness can be suitably suppressed.

Other Embodiment

The present invention is not limited to the embodiments described according to the above description and the figures, and for example, the following embodiments are also encompassed within a technical scope of the present invention.

(1) Other than each embodiment described above, a specific numerical value of the light transmissivity in the low light-transmissive member can be appropriately changed.

(2) In each embodiment described above, a case in which the low light-transmissive member includes the light blocking layer having an extremely low light transmissivity has been shown, but for example, the low light-transmissive member may be configured by a semi-transparent light blocking layer such as a gray tone light blocking layer or a half tone light blocking layer. In this way, the degree of freedom, related to the light transmissivity of the low light-transmissive member can be enhanced.

(3) In each embodiment described above, a case in which the low light-transmissive member is formed in a manner of being stacked on the front surface of the optical sheet by printing or application has been shown, but for example, the low light-transmissive member may be formed by performing embossing, surface texturing, or the like on the front surface of the light entering-side edge section overlapping section and the extended portion of the optical sheet, and the light may be scatter reflected at the low light-transmissive member or the processed area so that the light transmissivity of the low light-transmissive member becomes lower than the other portions. In addition, for example, a distribution density of the diffusing particles contained in the base member of the diffuser sheet may be controlled so that the distribution density of the diffusing particles at the light entering-side edge section overlapping section and the extended portion is higher than the distribution density of the diffusing particles at other portions, and hence the light entering-side edge section overlapping section and the extended portion may be assumed as the low light-transmissive member.

(4) In each embodiment described above, a case in which the low light-transmissive member is directly formed on the optical sheet has been described, but the low light-transmissive member may be formed on a member separate from the optical sheet, and the member formed with the low light-transmissive member may be stacked and arranged with respect to the optical sheet.

(5) In each embodiment described above, a case in which the low light-transmissive member is arranged across the light entering-side edge section overlapping section and the extended portion of the optical sheet has been described, but the low light-transmissive member may be selectively arranged only on the light entering-side edge section overlapping section without being arranged on the extended portion.

(6) Other than each embodiment described above, a specific forming range of the low light-transmissive member in the optical sheet can be appropriately changed.

(7) Other than each embodiment described above, specific number, type, stacking order and the like of the optical sheet can be appropriately changed. A reflection type polarizing sheet, a wavelength converting sheet including a phosphor and the like can be used for the optical sheet other than the diffuser sheet and the prism sheet. Furthermore, optical sheets of the same type may be used for the optical sheet. Moreover, even if the stacking order of the optical sheet is changed, the low light-transmissive member is preferably arranged on the optical sheet closest to the light guide plate.

(8) When using the wavelength converting sheet for the optical sheet in (7) described above, an LED that emits only blue, an LED that emits a magenta light, and an LED that emits a cyan light may be used for the LED, and a wavelength converting sheet containing a phosphor (green phosphor that emits a green light, a red phosphor that emits a red light, a yellow phosphor that emits a yellow light, etc.) that emits a fluorescent light of a color to become a complementary color of the emitted light of the LED, with a blue light contained in the light of the LED as an excitation light, is preferably used for the wavelength converting sheet.

(9) In each embodiment described above, a case in which the low light-transmissive member is arranged on the optical sheet closest to the light guide plate of the optical sheets has been described, but the low light-transmissive member may be arranged on other optical sheets. Specifically, for example, the low light-transmissive member may be arranged on the first prism sheet or the second prism sheet.

(10) In each embodiment described above, a case in which the low light-transmissive member is arranged on only one of either the front or back plate surface of the optical sheet has been described, but the low light-transmissive member may be arranged on each one of the front and back plate surfaces of the optical sheet.

(11) In each embodiment described above, a case in which the low light-transmissive member is arranged only on one of the optical sheets has been described, but the low light-transmissive member may be arranged on each of the optical sheets.

(12) In each embodiment described above, a case in which the optical sheet is arranged on the light exiting plate surface of the light guide plate in a directly overlapping manner has been described, but a configuration in which the optical sheet is arranged on the light exiting plate surface of the light guide plate with a spacing formed by a spacer and the like therebetween may be adopted.

(13) In each embodiment described above, a case in which the planar shape of the liquid crystal panel, the optical sheet, the light guide plate and the like has a square shape has been described, but the planar shape of the liquid crystal panel, the optical sheet, the light guide plate and the like may be non-square shape such as circular shape, elliptical shape and the like.

(14) Other than each embodiment described above, a specific number of LEDs to be mounted on the LED substrate can be appropriately changed.

(15) In the sixth and seventh embodiments, a case in which two convex portions and two concave portions are arranged has been described, but three or more convex portions and three or more concave portions may be arranged.

(16) In the eighth and ninth embodiments, a case in which the light guide plate fixing member is evenly arranged at the portion not overlapping the LED in the X axis direction in the optical sheet has been described, but a configuration in which the light guide plate fixing member is not arranged at the portion not overlapping the LED in the X axis direction in the optical sheet may be adopted.

(17) In the tenth embodiment described above, a case in which the effective light exiting area overlapping section that overlaps the effective light exiting area of the low light-transmissive member includes the dot shaped light blocking layer has been described, but the effective light exiting area overlapping section may be configured by a semitransparent light blocking layer such as a gray tone light blocking layer, a halftone light blocking layer, or the like described in (2) above.

(18) The configuration described in the second embodiment described above may be combined with the configurations described in the third to seventh, and tenth to twelfth embodiments.

(19) The configuration described in the third to seventh embodiments described above may be combined with the configurations described in the eighth to twelfth embodiments.

(20) The configuration described in the eighth and ninth embodiments described above may be combined with the configurations described in the tenth to twelfth embodiments.

(21) The configuration described in the tenth embodiment described above may be combined with the configurations described in the eleventh and twelfth embodiments.

(22) In each embodiment described above, the LED substrate including a film-like base member has been illustrated, but the base member of the LED substrate is configured to a plate shape having a constant thickness.

(23) In each embodiment described above, the LED substrate in which the LED is mounted on a substrate portion has been illustrated, but the present invention is also applicable to a light source substrate in which other light sources such as an organic EL and the like are mounted.

(24) In each embodiment described above, the liquid crystal display device used in a portable information terminal such as a smartphone, a tablet notebook personal computer and the like, has been illustrated, but for example, the present invention is also applicable to a liquid crystal display device used in an in-vehicle information terminal (portable car navigation system), portable game machine and the like.

(25) In each embodiment described above, the configuration in which the color sections of the color filter in the liquid crystal panel have three colors of R, G, and B has been illustrated, but the color section may be four or more colors.

(26) In each embodiment described above, the TFT is used for the switching element of the liquid crystal display device, but application can also be made to a liquid crystal display device using a switching element (e.g., thin film diode (TFD)) other than the TFT, and application can also be made to a black and white displaying liquid crystal display device other than the color displaying liquid crystal display device.

(27) In each embodiment described above, the liquid crystal display device including the backlight device and the liquid crystal panel for the display panel has been described, but the present invention is also applicable to an MEMS display device including the backlight device, and an MEMS (Micro Electro Mechanical Systems) display panel for the display panel.

EXPLANATION OF SYMBOLS

10: Liquid crystal display device (Display device)
11, 211, 311, 411: Liquid crystal panel (Display panel)
12: Backlight device (Lighting device)
13, 113, 213, 313, 513, 613, 713, 813, 1013, 1113: LED (Light source)
14, 114, 214: LED substrate (Light source substrate)
15, 215, 715, 815, 1015: Light guide plate
15a, 115a, 715a, 815a: Light entering end surface
15b, 915b, 15b: Light exiting plate surface
15c: Opposite plate surface
16, 116, 216, 516, 716, 816: Optical sheet (Optical member)
16a, 216a, 416a, 516a, 616a, 716a, 816a, 916a, 1016a, 1116a: Diffuser sheet (Optical member)
18, 218, 318, 418, 518, 618, 818: Frame
19, 219, 319, 419: Panel fixing member (Frame fixing member)
21, 721, 821: Light entering-side edge section
22, 122, 722, 822, 922, 1022, 1122: Light entering-side edge section overlapping section
23, 123, 223, 423, 523, 623, 823, 923, 1023, 1123: Extended portion
24, 124, 224, 524, 624, 724, 924, 1024, 1124: Low light-transmissive area
25, 325: Second frame fixing member (Frame fixing member)
26, 626: Convex portion
27, 627: Concave portion
28, 828: Light guide plate fixing member
EA: Effective light exiting area
NEA: Non-effective light exiting area

The invention claimed is:
1. A lighting device comprising:
at least one light source;
a light guide plate including:
a light entering end surface through which light from the at least one light source enters, the light entering end surface being an outer peripheral end surface of the light guide plate; and
a pair of plate surfaces including a first plate surface configured as a light exiting plate surface through which the light exits and a second plate surface configured as an opposite plate surface;
a light source substrate on which the at least one light source is mounted, the light source substrate being disposed such that at least a section thereof overlaps a light entering-side edge section of the opposite plate surface of the light guide plate, the light entering-side edge section being an edge section of the light guide plate on a light entering end surface side;
at least one optical member including a light entering-side edge section overlapping section disposed on a light exiting plate surface side with respect to the light guide plate to overlap the light entering-side edge section; and
at least one low light-transmissive member disposed in at least the light entering-side edge section overlapping section of the at least one optical member, the at least one low light-transmissive member having a transmissivity lower than that of other sections of the at least one optical member.

2. The lighting device according to claim 1, wherein
the at least one optical member includes an extended portion extending from the light entering-side edge section overlapping section toward the at least one light source, the extended portion including a section overlapping the at least one light source, and
the at least one low light-transmissive member extends from at least the light entering-side edge section overlapping section to the extended portion.

3. The lighting device according to claim 1, wherein the at least one low light-transmissive member is disposed on a surface of the at least one optical member on a light guide plate side.

4. The lighting device according to claim 3, wherein
the at least one optical member includes a plurality of optical members that overlap each other, and
the at least one low light-transmissive member is disposed on the optical member closest to the light guide plate.

5. The lighting device according to claim 1, wherein the at least one low light-transmissive member is disposed to overlap a non-effective light exiting area that is an area of the light exiting plate surface that is sectionalized to an effective light exiting area from which light effectively exits and the non-effective light exiting area surrounding the effective light exiting area.

6. The lighting device according to claim 5, wherein the at least one low light-transmissive member is two-dimensionally arranged outer than an inner boundary of the non-effective light exiting area.

7. The lighting device according to claim 1, wherein
the at least one low light-transmissive member is two-dimensionally arranged to cross a boundary between a non-effective light exiting area and an effective light exiting area of the light exiting plate surface that is sectionalized to the effective light exiting area from which light effectively exits and the non-effective light exiting area surrounding the effective light exiting area, and
the at least one low light-transmissive member includes a section that overlaps the effective light exiting area having light transmissivity higher than that of a section that overlaps the non-effective light exiting area.

8. The lighting device according to claim 1, wherein the at least one low light-transmissive member includes a t blocking layer that is laid on the at least one optical member.

9. The lighting device according to claim 1, wherein
the at least one light source includes a plurality of light sources arranged in line along a length direction of the light entering end surface, and
the at least one low light-transmissive member includes a plurality of low light-transmissive members that are arranged in line to overlap the light sources in the length direction of the at least one optical member.

10. The lighting device according to claim 9, further comprising a plurality of light guide plate fixing members that fix the light entering-side edge section overlapping section to at least the light entering-side edge section, the light guide plate fixing members being arranged in line not to overlap the low light-transmissive members in the length direction.

11. The lighting device according to claim 10, wherein
the at least one optical member includes an extended portion extending from the light entering-side edge section overlapping section toward the light source, the extended portion including a section that overlaps the at least one light source,
the light guide plate includes a plurality of projections that project outward from the light entering end surface toward the light source side, the projections being arranged in line to overlap the light guide plate fixing members in the length direction, and
the light guide plate fixing members fix the light entering-side edge section overlapping section and the extended portion to the light entering-side edge section and the projections.

12. The lighting device according to claim 1, further comprising:
a frame having a rim shape to surround the at least one light source and the light guide plate; and
a frame fixing member that fixes the at least one optical member to the frame.

13. The lighting device according to claim 12, wherein
the frame includes a concave portion, and
the at least one optical member includes a convex portion inserted in the concave portion.

14. A display device comprising:
the lighting device according to claim 1; and
a display panel configured to display an image using light from the lighting device.

* * * * *